(12) United States Patent
Gentry et al.

(10) Patent No.: US 12,231,856 B2
(45) Date of Patent: Feb. 18, 2025

(54) CONSTRUCTION TECHNIQUES FOR HEARING INSTRUMENTS

(71) Applicant: Starkey Laboratories, Inc., Eden Prairie, MN (US)

(72) Inventors: Westley G. Gentry, Buffalo, MN (US); Michael Karl Sacha, Chanhassen, MN (US); Craig C. Feldsien, Prior Lake, MN (US); Jay Stewart, Eden Prairie, MN (US)

(73) Assignee: Starkey Laboratories, Inc., Eden Prairie, MN (US)

( * ) Notice: Subject to any disclaimer, the term of this patent is extended or adjusted under 35 U.S.C. 154(b) by 138 days.

(21) Appl. No.: 17/663,113

(22) Filed: May 12, 2022

(65) Prior Publication Data

US 2022/0272467 A1     Aug. 25, 2022

Related U.S. Application Data

(63) Continuation of application No. PCT/US2020/059865, filed on Nov. 10, 2020.
(Continued)

(51) Int. Cl.
*H04R 25/00*        (2006.01)
*B29C 64/124*     (2017.01)
(Continued)

(52) U.S. Cl.
CPC ......... *H04R 25/658* (2013.01); *B29C 64/124* (2017.08); *B33Y 10/00* (2014.12);
(Continued)

(58) Field of Classification Search
CPC ..... B29C 64/20; B29C 64/255; B29C 64/307; B29C 64/379; B29C 64/40; B29C 64/171; B29C 64/124
See application file for complete search history.

(56) References Cited

U.S. PATENT DOCUMENTS

| | | |
|---|---|---|
| 6,549,821 B1 | 4/2003 | Farnworth et al. |
| 2002/0025055 A1 | 2/2002 | Stonikas et al. |

(Continued)

FOREIGN PATENT DOCUMENTS

| | | |
|---|---|---|
| CN | 106313573 A | 1/2017 |
| CN | 109604602 A | 4/2019 |

(Continued)

OTHER PUBLICATIONS

Communication pursuant to Article 94(3) EPC from counterpart European Application No. 20817579.4 dated Mar. 14, 2024, 8 pp.
(Continued)

*Primary Examiner* — Stella K Yi
(74) *Attorney, Agent, or Firm* — Shumaker & Sieffert, P.A.

(57) ABSTRACT

A method for manufacturing a hearing instrument includes placing a component support structure at least partially in a bath of a resin liquid, wherein one or more operative components of the hearing instrument are attached to or contained within the component support structure prior to the component support structure being at least partially placed in the bath of the resin liquid. While the component support structure is at least partially in the bath, volumetric 3-dimensional (3D) printing is performed to form a shell of the hearing instrument attached to the component support structure.

20 Claims, 14 Drawing Sheets

Related U.S. Application Data

(60) Provisional application No. 62/934,933, filed on Nov. 13, 2019.

(51) Int. Cl.
*B33Y 10/00* (2015.01)
*B33Y 80/00* (2015.01)

(52) U.S. Cl.
CPC ............ *B33Y 80/00* (2014.12); *H04R 25/604* (2013.01); *H04R 25/609* (2019.05); *H04R 2225/57* (2019.05); *H04R 2225/77* (2013.01)

(56) References Cited

U.S. PATENT DOCUMENTS

| | | | |
|---|---|---|---|
| 2004/0258264 A1* | 12/2004 | Jorgensen | H04R 25/602 381/328 |
| 2005/0074543 A1* | 4/2005 | Stevens | B05D 7/02 427/558 |
| 2017/0134844 A1 | 5/2017 | Liu et al. | |

FOREIGN PATENT DOCUMENTS

| | | |
|---|---|---|
| WO | 2011025676 A1 | 3/2011 |
| WO | 2014209994 A3 | 12/2014 |
| WO | 2019104397 A1 | 6/2019 |

OTHER PUBLICATIONS

Huang et al., "Assembly and applications of 30 conformal electronics on curvilinear surfaces", vol. 6, No. 4, Jan. 1, 2019, pp. 642-683.
"3D Printing in a Fraction of the Time", YouTube, Retrieved from: https://www.youtube.com/watch, Dec. 8, 2017, 2 pp.
International Preliminary Report on Patentability from International Application No. PCT/US2020/059865, dated May 17, 2022, 14 pp.
International Search Report and Written Opinion of International Application No. PCT/US2020/059865 dated Apr. 1, 2021, 22 pp.
Response to Communication pursuant to Article 94(3) EPC dated Mar. 14, 2024, from counterpart European Application No. 20817579.4 filed Aug. 14, 2024, 11 pp.

* cited by examiner

CONSTRUCTION TECHNIQUES FOR HEARING INSTRUMENTS

This application is a continuation of International Application No. PCT/US2020/059865, filed Nov. 10, 2020, which claims the benefit of U.S. Provisional Patent Application 62/934,933, filed Nov. 13, 2019, the entire content of both of which are incorporated by reference herein.

TECHNICAL FIELD

This disclosure relates to hearing instruments.

BACKGROUND

Hearing instruments are devices designed to be worn on, in, or near one or more of a user's ears. Common types of hearing instruments include hearing assistance devices (e.g., "hearing aids"), earbuds, headphones, hearables, cochlear implants, and so on. In some examples, a hearing instrument may be implanted into a user or integrated into a bone of a user. Some hearing instruments include additional features beyond environmental sound-amplification. For example, some modern hearing instruments include advanced audio processing for improved device functionality, controlling and programming the devices, and beamforming, and some can even communicate wirelessly with external devices including other hearing instruments (e.g., for streaming media).

SUMMARY

This disclosure describes techniques for manufacturing hearing instruments. As described herein, a component support structure is placed at least partially in a resin bath. One or more operative components of the hearing instrument are attached to or contained within the component support structure. While the component support structure is at least partially in the resin bath, a 3-dimensional (3D) printing apparatus performs volumetric 3D printing to form a shell of the hearing instrument attached to the component support structure. Volumetric 3D printing may also be referred to as volumetric additive manufacturing.

In one example, this disclosure describes a method for manufacturing a hearing instrument, the method comprising: placing a component support structure at least partially in a bath of a resin liquid, wherein one or more operative components of the hearing instrument are attached to or contained within the component support structure prior to the component support structure being at least partially placed in the bath of the resin liquid; and while the component support structure is at least partially in the bath, performing volumetric 3D printing to form a shell of the hearing instrument attached to the component support structure.

In another example, this disclosure describes a hearing instrument comprising: a component support structure; one or more operative components attached to or contained within the component support structure; a shell attached to the component support structure, wherein the shell is formed by a process of: placing the component support structure at least partially in a bath of a resin liquid, wherein the one or more operative components of the hearing instrument are attached to or contained within the component support structure prior to the component support structure being at least partially placed in the bath of the resin liquid; and while the component support structure is at least partially in the bath, performing volumetric 3-dimensional (3D) printing to form the shell of the hearing instrument.

In another example, this disclosure describes a system comprising: a container comprising a bath of a resin liquid; and a 3D printing apparatus configured to perform volumetric 3D printing to form a shell of the hearing instrument attached to a component support structure while the component support structure is at least partially in the bath, wherein one or more operative components of the hearing instrument are attached to or contained within the component support structure prior to the component support structure being at least partially placed in the bath of the resin liquid.

In another example, this disclosure describes a computer-readable medium comprising instructions that, when executed, cause a 3D printing apparatus to perform volumetric 3D printing to form a shell of a hearing instrument attached to a component support structure while the component support structure is at least partially in a bath of a resin liquid, wherein one or more operative components of the hearing instrument are attached to or contained within the component support structure prior to the component support structure being at least partially placed in the bath of the resin liquid.

The details of one or more aspects of the disclosure are set forth in the accompanying drawings and the description below. Other features, objects, and advantages of the techniques described in this disclosure will be apparent from the description, drawings, and claims.

DETAILED DESCRIPTION

Figure 1:
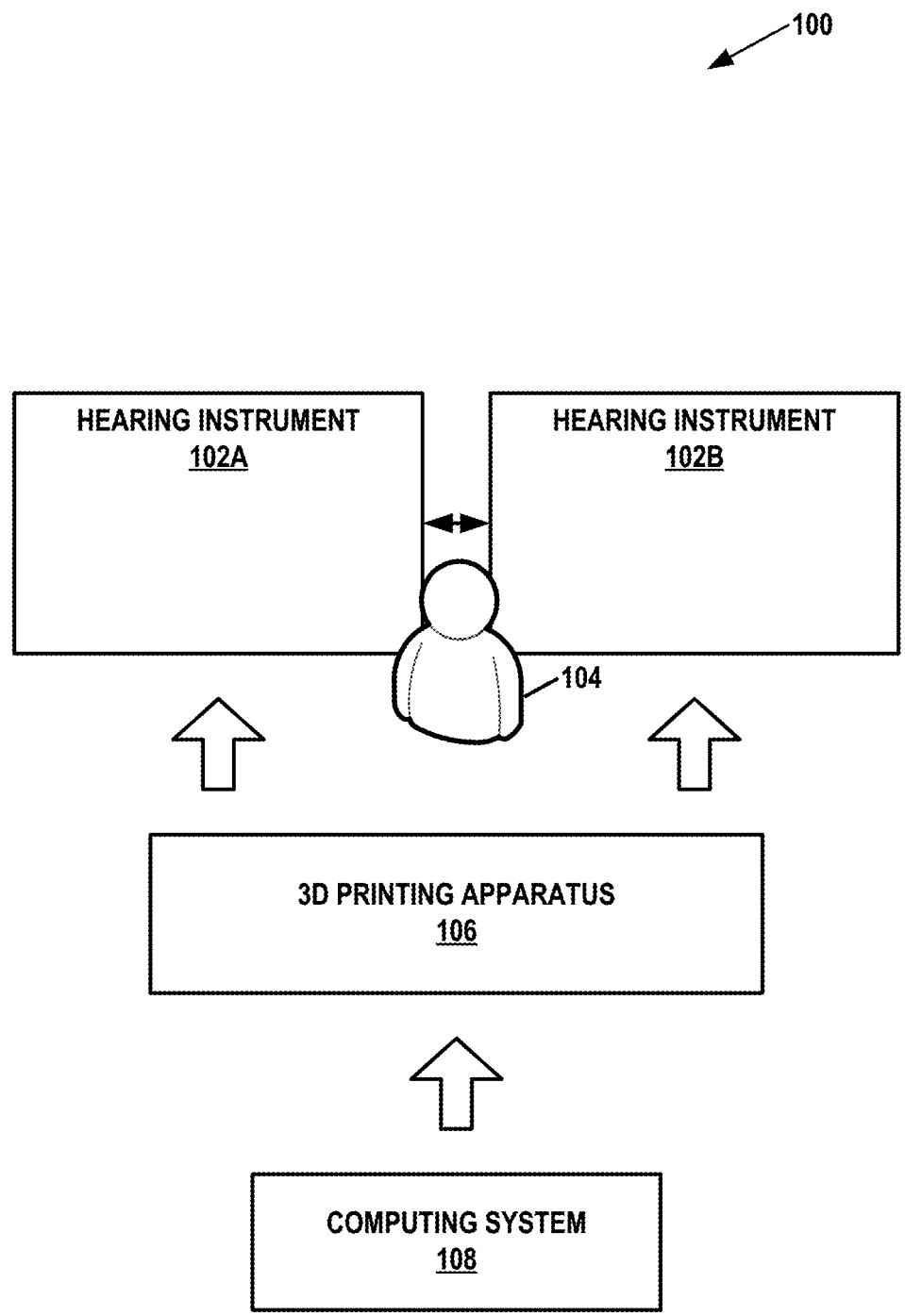
FIG. 1 is a conceptual diagram illustrating an example system that includes hearing instruments, in accordance with one or more examples of this disclosure.

Hearing instruments are typically small, delicate devices that include several operative components encased within one or more shells. Example operative components of a hearing instrument include microphones, receivers, processors, batteries, antennas, sensors, circuitry, and so on. A shell is typically a plastic object that defines a cavity that contains the functional components. The shell may be made of one or more types of materials, such as plastic, silicones, urethanes, carbon fiber materials, hybrid materials, and so on. In some examples, the shell may be referred to as a housing or case. In some examples, the shape of a shell is customized to fit specific users. The shape of the shell may be based on an ear impression scan. In some examples, the shape of a shell is semi-customized, such that there is a range of differently sized and shaped shells.

Furthermore, in some examples, a shell is initially open-ended. In such examples, some or all of the operative components of a hearing instrument are included in or attached to a faceplate (i.e., a top plate). For instance, the faceplate may contain transducers, sensors, circuitry, and other components. During assembly of the hearing instrument, the faceplate is attached to the shell such that the operative components of the hearing instrument are contained within the cavity defined by the shell and such that the faceplate and the shell together define the outer surface of the hearing instrument. In such examples, a manufacturer may polish and buff the assembled hearing instrument to remove extra material and increase the aesthetic appearance of the hearing instrument. For instance, excess faceplate material may be cut away and buffing or polishing may take place to yield a functional, cosmetically appealing device.

Because the operative components of the hearing instrument are initially included in or attached to a faceplate, the operative components of the hearing instrument need to be arranged in a way that allows the operative components to be inserted as a unit into a shell. For example, an ideal arrangement of the operative components might conform to a curved or twisted cavity of a shell. However, in this example, because the operative components are attached to the faceplate, it might not be possible to insert the operative components into the cavity defined by the shell. Alternatively, assembling one or more operative components separately within the cavity defined by the shell may be a painstaking and slow process that may require high levels of worker training and dexterity. Moreover, assembling one or more operative components separately within the cavity defined by the shell may limit the ability to produce smaller hearing instruments.

Because the shells for some types of hearing instruments have complex shapes, layer-by-layer 3-dimensional (3D) printing techniques have been used to fabricate such shells. Because of the layer-by-layer approach for 3D printing of shells, individual layers may, in some instances, be seen and/or felt. Accordingly, additional manufacturing steps may be required to smooth the shells and/or cover the shells with an exterior coat. Each additional manufacturing step may introduce costs and may increase the amount of time required to manufacture each hearing instrument. In some instances, layer-by-layer 3D printing techniques may be used to fabricate shells with smooth surfaces, but such techniques typically incur significantly greater resource costs.

This disclosure describes examples that may address such challenges. For example, as described herein, a method for manufacturing a hearing instrument comprises placing a component support structure at least partially in a resin bath. One or more operative components of the hearing instrument are attached to or contained within the component support structure prior to the component support structure being placed at least partially in the resin bath. Plugs or other items may cover openings of the operative components while the operative components are in the resin bath to protect the operative components from the resin bath. Furthermore, in this example, the method includes using, while the component support structure is at least partially in the resin bath, volumetric 3D printing to form a shell of the hearing instrument that is attached to the component support structure by selectively polymerizing molecules within the resin bath (e.g., by exposure to sufficiently high light levels at particular locations within the resin bath for polymerization to occur). In other words, the component support structure may hold the operative components in a desired orientation and position (i.e., fixture the components) while the shell is printed around the operative components. Manufacturing hearing instruments in this way may speed up the manufacturing process for hearing instruments, increase product quality, increase device reliability, increase device robustness, decrease the number of manufacturing steps, decrease the number of post-processing steps, enable manufacture of smaller hearing instruments, enable multi-material 3D printing, and other potential improvements.

FIG. 1 is a conceptual diagram illustrating an example system 100 that includes hearing instruments 102A, 102B, in accordance with one or more examples of this disclosure. This disclosure may refer to hearing instruments 102A and 102B collectively, as "hearing instruments 102." A user 104 may wear hearing instruments 102. In some instances, such as when user 104 has unilateral hearing loss, user 104 may wear a single hearing instrument. In other instances, such as when user 104 has bilateral hearing loss, the user may wear two hearing instruments, with one hearing instrument for each ear of the user.

Hearing instruments 102 may comprise one or more of various types of devices that are configured to provide auditory stimuli to a user and that are designed for wear and/or implantation at, on, or near an ear of the user. Hearing instruments 102 may be worn, at least partially, in the ear canal or concha. One or more of hearing instruments 102 may include behind the ear (BTE) components that are worn behind the ears of user 104. In some examples, hearing instruments 102 comprise devices that are at least partially implanted into or integrated with the skull of the user. In some examples, one or more of hearing instruments 102 is able to provide auditory stimuli to user 104 via a bone conduction pathway.

In any of the examples of this disclosure, each of hearing instruments 102 may comprise a hearing assistance device. Hearing assistance devices include devices that help a user hear sounds in the user's environment. Example types of hearing assistance devices may include hearing aid devices, Personal Sound Amplification Products (PSAPs), cochlear implant systems (which may include cochlear implant magnets, cochlear implant transducers, and cochlear implant processors), and so on. In some examples, hearing instruments 102 are over-the-counter, direct-to-consumer, or prescription devices. Furthermore, in some examples, hearing instruments 102 include devices that provide auditory stimuli to the user that correspond to artificial sounds or sounds that are not naturally in the user's environment, such as recorded music, computer-generated sounds, or other types of sounds. For instance, hearing instruments 102 may include so-called "hearables," earbuds, earphones, or other types of devices. Some types of hearing instruments provide auditory stimuli to the user corresponding to sounds from the user's environmental and also artificial sounds.

In some examples, one or more of hearing instruments 102 includes a housing or shell that is designed to be worn in the ear for both aesthetic and functional reasons and encloses the operative components of the hearing instrument. Such hearing instruments may be referred to as in-the-ear (ITE), in-the-canal (ITC), completely-in-the-canal (CIC), or invisible-in-the-canal (IIC) devices. In some examples, one or more of hearing instruments 102 may be behind-the-ear (BTE) devices, which include a housing worn behind the ear that contains all of the operative components of the hearing instrument, including the receiver (e.g., a speaker). The receiver conducts sound to an earbud inside the ear via an audio tube. In some examples, one or more of hearing instruments 102 may be receiver-in-canal (RIC) hearing-assistance devices, which include a housing worn behind the ear that contains operative components and a housing worn in the ear canal that contains the receiver.

Hearing instruments 102 may implement a variety of features that help user 104 hear better. For example, hearing instruments 102 may amplify the intensity of incoming sound, amplify the intensity of certain frequencies of the incoming sound, or translate or compress frequencies of the incoming sound. In another example, hearing instruments 102 may implement a directional processing mode in which hearing instruments 102 selectively amplify sound originating from a particular direction (e.g., to the front of the user) while potentially fully or partially canceling sound originating from other directions. In other words, a directional processing mode may selectively attenuate off-axis unwanted sounds. The directional processing mode may help users understand conversations occurring in crowds or other noisy environments. In some examples, hearing instruments 102 may use beamforming or directional processing cues to implement or augment directional processing modes.

Hearing instruments 102 may be configured to communicate with each other. For instance, in any of the examples of this disclosure, hearing instruments 102 may communicate with each other using one or more wirelessly communication technologies. Example types of wireless communication technology include Near-Field Magnetic Induction (NFMI) technology, a 900 MHz technology, a BLUETOOTH™ technology, a WI-FI™ technology, audible sound signals, ultrasonic communication technology, infrared communication technology, an inductive communication technology, or another type of communication that does not rely on wires to transmit signals between devices. In some examples, hearing instruments 102 use a 2.4 GHz frequency band for wireless communication. In examples of this disclosure, hearing instruments 102 may communicate with each other via non-wireless communication links, such as via one or more cables, direct electrical contacts, and so on.

As shown in the example of FIG. 1, system 100 may also include a computing system 108. In other examples, system 100 does not include computing system 108. Computing system 108 comprises one or more computing devices, each of which may include one or more processors. For instance, computing system 108 may comprise one or more mobile devices, server devices, personal computer devices, handheld devices, wireless access points, smart speaker devices, smart televisions, medical alarm devices, smart key fobs, smartwatches, smartphones, motion or presence sensor devices, smart displays, screen-enhanced smart speakers, wireless routers, wireless communication hubs, prosthetic devices, mobility devices, special-purpose devices, and/or other types of devices. Actions described in this disclosure as being performed by computing system 108 may be performed by one or more of the computing devices of computing system 108. Computing system 108 may include processing circuitry, such as one or more microprocessors, application-specific integrated circuits, field-programmable gate arrays, and so on that perform information processing tasks ascribed in this disclosure to computing system 108.

In accordance with an example of this disclosure, one or more of hearing instruments 102 may be manufactured using a method that comprises placing a component support structure at least partially in a bath of a resin liquid. Example venders of such resin liquid may include Drava, Detax, Delta Med, Asiga, and others. For instance, the component support structure may be placed entirely in the bath of the resin liquid. In this example, one or more operative components of the hearing instrument are attached to or contained within the component support structure prior to the component support structure being at least partially placed in the bath of the resin liquid. In this example, while the component support structure is at least partially in the resin bath, a 3-dimensional (3D) printing apparatus 106 may perform volumetric 3D printing to form a shell of the hearing instrument attached to the component support structure. As described in this disclosure, 3D printing apparatus 106 may be implemented in one of a variety of ways. For instance, as described with respect to the example of FIG. 4, 3D printing apparatus 106 may be implemented as an apparatus that performs a form of volumetric 3D printing referred to as holographic lithography. As described with respect to the example of FIG. 5, 3D printing apparatus 106 may be implemented as an apparatus that performs a form of volumetric 3D printing referred to as axial lithography.

In some examples, prior to manufacturing a hearing instrument, an ear impression of a user's ear canal may be taken, and the resulting data may be provided to computing system 108. An operator of computing system 108 may then use computing system 108 to generate a virtual arrangement of operative components of a hearing instrument (e.g., a battery, telecoil, sensors, valves, processors, receivers, etc.). To generate the virtual arrangement of operative components, the operator of computing system 108 may manipulate (e.g., using a computer assisted design (CAD) application) the positions and orientations of the operative components until a shell can be created that contains the operative components and fits within the user's ear canal. In some instances, the operator may manipulate the positions and orientations of the operative components to achieve a virtual arrangement of the operative components that results in a smallest possible shell. In some examples, computing system 108 may automatically generate the virtual arrangement of operative components. For example, computing system 108 may start with a default arrangement of the operative components and iteratively translate and/or rotate each of the operative components until the operative components are within constraints imposed by the shape of the user's ear canal.

Thus, in some examples, a process of manufacturing a hearing instrument may include obtaining, by computing system 108, a 3D impression of a user's ear canal. Additionally, computing system 108 may determine, based on the 3D impression of the user's ear canal, an arrangement of the operative components that fits within the user's ear canal. Computing system 108 may also determine a shape of the component support structure that holds the operative components in the determined arrangement. The component support structure may be formed (e.g., by 3D printing, molding, stamping, cutting, etc.) according to the determined shape. The component support structure may comprise one or more types of materials, such as one or more types of plastic or metal.

Because the shell will be created around the operative components using volumetric 3D printing, the virtual arrangement does not need to be generated with certain types of manufacturing considerations, such as how to insert the operative components into the shell. For instance, it may be ideal to place a speaker (e.g., a receiver) at a medial tip of a hearing instrument, but this might not be possible because the speaker cannot be inserted through a lateral end of the hearing instrument because of a curve of the hearing instrument and cannot be physically placed at the tip of the hearing instrument from a medial end of the hearing instrument because the user's ear canal is not large enough to allow the receiver to slide through an opening in the medial end of the hearing instrument. Thus, when using conventional manufacturing techniques, placement of a speaker at the medial tip of the hearing instrument may require the shell of the hearing instrument to be ground down, which is a costly and time-consuming step. However, when using the examples of this disclosure, the speaker may be placed as needed (e.g., at the medial tip of the hearing instrument) so long as an outline of the speaker does not protrude outside the shell.

After generating the virtual arrangement of the operative components, the operator may design a component support structure to hold the operative components at the positions and orientations indicated by the virtual arrangement of the operative components. Thus, the component support structure may serve as a "spine" for the operative components. In some examples, instead of an operator performing the above steps, a computer program may perform one or more of the above steps. In an example where a computer program designs the component support structure, the computer program may start with a cloud of vertices surrounding the virtual arrangement. The cloud of vertices defines a 3-dimensional surface. The computer program may then iteratively move the vertices inward toward the operative components such that the 3-dimensional surface defines a minimum volume of a given thickness around the operative components. Conceptually, this computer program forms a cloud of vertices in a way that is akin to applying shrink wrap over the operative components. In this example, the computer program may then define holes in the 3-dimensional surface as needed for ports, openings, and/or connectors of the operative components.

After the component support structure is designed, the component support structure may be manufactured (e.g., using 3D printing, injection molding, etc.). The operative components may then be attached (e.g., manually or using a machine) to the component support structure. For instance, in some examples, 3D printing apparatus 106 may perform a 3D printing process (e.g., a volumetric 3D printing process or a layer-by-layer 3D printing process) to form the component support structure. In other examples, system 100 includes a second 3D printing apparatus separate from 3D printing apparatus 106, which is configured to perform a 3D printing process (e.g., a volumetric 3D printing process or a layer-by-layer 3D printing process) to form the component support structure.

In some examples, one or more features may be formed directly on the component support structure before or after operative components are attached to the component support structure. For example, electrical traces, printed coils, sensor electrodes, or other components may be formed directly on the component support structure. In some examples, 3D printing or vapor deposition may be performed to form the features on the component support structure. In examples where electrical traces are formed on the component support structure, the electrical traces may serve to provide power and/or communication between the operative components. In other words, an electrical trace formed on the component support structure may provide at least one of power or communication between two or more of the operative components of the hearing instrument. In some such instances, operative components, such as speakers, microphones, sensors, etc., may make electrical connections through the electrical traces by interference fit. This may allow for a modular and efficient approach for manufacturing hearing instruments.

The examples of this disclosure, such as the use of a component support structure (e.g., a "spine") along with volumetric 3D printing may offer solutions for constructing smaller hearing instruments with shorter build times. Additionally, such hearing instruments may need less post-processing and may be closer to a finished state, which may result in labor savings.

Because the operative components are placed in a resin liquid bath, one or more of the operative components may need to be protected from the resin liquid bath. For example, entry of the resin liquid into an opening of a transducer, such as a microphone or speaker, may damage the transducer. In accordance with the examples of this disclosure, issues associated with entry of the resin liquid into operative components may be addressed in one or more ways. For instance, in one example, one or more of the operative components may be equipped with acoustically transparent port membranes. In some examples, disposable port plugs (e.g., plastic or foam port plugs) may be inserted into ports of operative components. In some examples, the port plugs may form part of a support member or other fixture that supports the operative components (or from which the operative components are suspended) while the operative components are in the resin bath.

Figure 2:
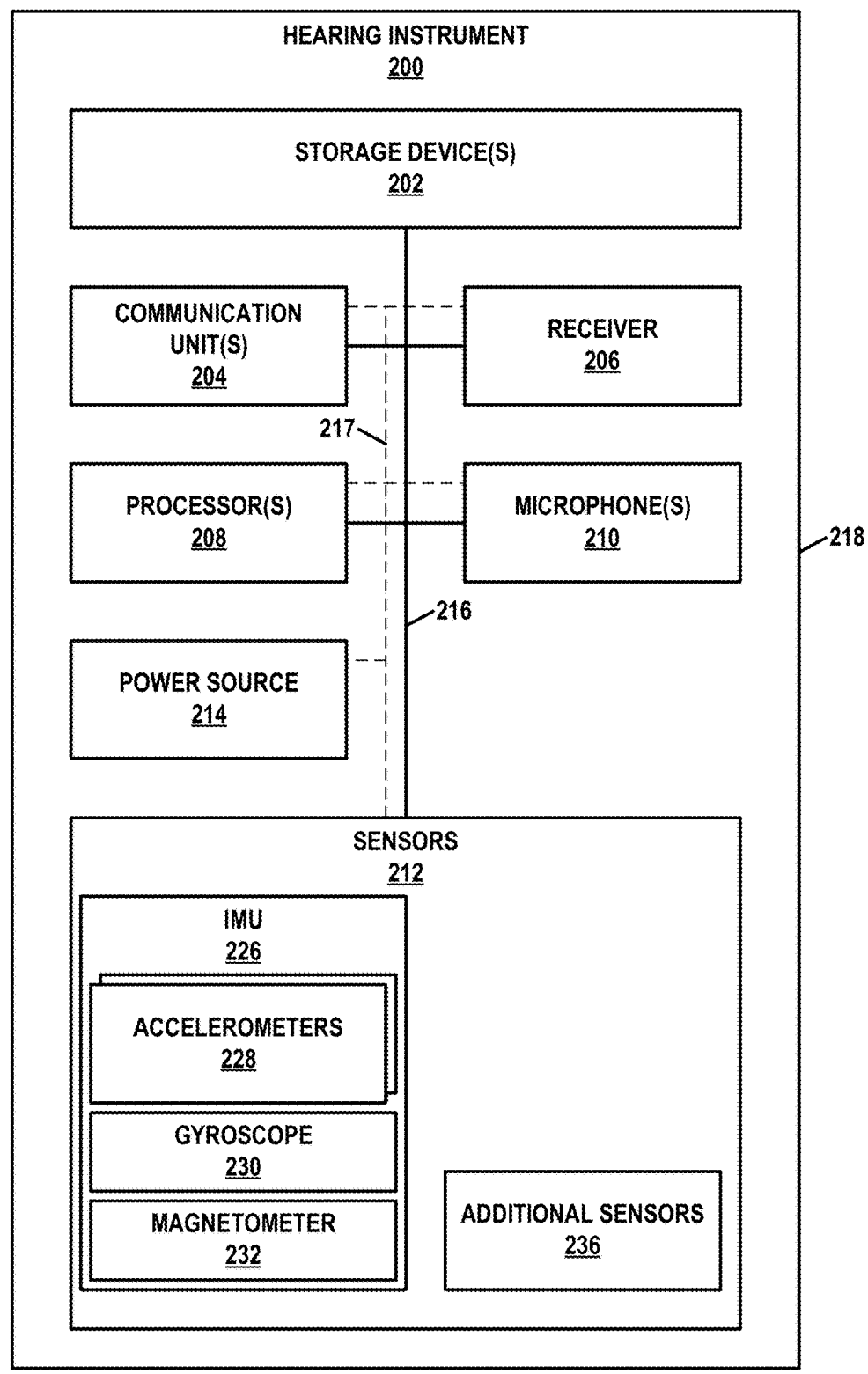
FIG. 2 is a block diagram illustrating example components of a hearing instrument, in accordance with one or more examples of this disclosure.

FIG. 2 is a block diagram illustrating example components of hearing instrument 200, in accordance with one or more examples of this disclosure. Hearing instrument 200 may be either one of hearing instruments 102. In the example of FIG. 2, hearing instrument 200 comprises one or more storage devices 202, one or more communication units 204, a receiver 206, one or more processors 208, one or more microphones 210, a set of sensors 212, a power source 214, and one or more communication channels 216. Communication channels 216 provide communication between storage devices 202, communication unit(s) 204, receiver 206, processor(s) 208, a microphone(s) 210, and sensors 212. Components 202, 204, 206, 208, 210, and 212 may draw electrical power from power source 214, e.g., via power supply connectors 217.

In the example of FIG. 2, each of components 202, 204, 206, 208, 210, 212, 214, 216, and 217 is contained within a single shell 218. However, in other examples of this disclosure, components 202, 204, 206, 208, 210, 212, 214, 216, and 217 may be distributed among two or more housings. For instance, in an example where hearing instrument 200 is a RIC device, receiver 206 and one or more of sensors 212 may be included in an in-ear housing separate from a behind-the-ear housing that contains the remaining components of hearing instrument 200. In such examples, a RIC cable may connect the two housings. In accordance with one or more examples of this disclosure, a 3D printing apparatus (e.g., 3D printing apparatus 106 (FIG. 1)) may perform volumetric 3D printing to form one or more of the shells (e.g., housings) of hearing instrument 200, e.g., shell 218.

Furthermore, in the example of FIG. 2, sensors 212 include an inertial measurement unit (IMU) 226 that is configured to generate data regarding the motion of hearing instrument 200. IMU 226 may include a set of sensors. For instance, in the example of FIG. 2, IMU 226 includes one or more of accelerometers 228, a gyroscope 230, a magnetometer 232, combinations thereof, and/or other sensors for determining the motion of hearing instrument 200. Furthermore, in the example of FIG. 2, hearing instrument 200 may include one or more additional sensors 236. Additional sensors 236 may include a photoplethysmography (PPG) sensor, blood oximetry sensors, blood pressure sensors, electrocardiograph (EKG) sensors, body temperature sensors, electroencephalography (EEG) sensors, environmental temperature sensors, environmental pressure sensors, environmental humidity sensors, skin galvanic response sensors, and/or other types of sensors. In other examples, hearing instrument 200 and sensors 212 may include more, fewer, or different components.

Storage devices 202 may store data. Storage devices 202 may comprise volatile memory and may therefore not retain stored contents if powered off. Examples of volatile memories may include random access memories (RAM), dynamic random access memories (DRAM), static random access memories (SRAM), and other forms of volatile memories known in the art. Storage devices 202 may further be configured for long-term storage of information as non-volatile memory space and retain information after power on/off cycles. Examples of non-volatile memory configurations may include flash memories, or forms of electrically programmable memories (EPROM) or electrically erasable and programmable (EEPROM) memories.

Communication unit(s) 204 may enable hearing instrument 200 to send data to and receive data from one or more other devices, such as another hearing instrument, an accessory device, a mobile device, or another types of device. Communication unit(s) 204 may enable hearing instrument 200 to use wireless or non-wireless communication technologies. For instance, communication unit(s) 204 may enable hearing instrument 200 to communicate using one or more of various types of wireless technology, such as a BLUETOOTH™ technology, 3G, 4G, 4G LTE, 5G, ZigBee, WI-FI™, Near-Field Magnetic Induction (NFMI), ultrasonic communication, infrared (IR) communication, or another wireless communication technology. In some examples, communication unit(s) 204 may enable hearing instrument 200 to communicate using a cable-based technology, such as a Universal Serial Bus (USB) technology.

Receiver 206 comprises one or more speakers for generating audible sound. Microphone(s) 210 detect incoming sound and generate one or more electrical signals (e.g., analog or digital electrical signals) representing the incoming sound.

Processor(s) 208 may be processing circuits configured to perform various activities. For example, processor(s) 208 may process the signals generated by microphone(s) 210 to enhance, amplify, and/or cancel-out particular channels within the incoming sound. Processor(s) 208 may then cause receiver 206 to generate sound based on the processed signal. In some examples, processor(s) 208 include one or more digital signal processors (DSPs). In some examples, processor(s) 208 may cause communication unit(s) 204 to transmit one or more of various types of data. For example, processor(s) 208 may cause communication unit(s) 204 to transmit data to an external computing system.

Figure 3:
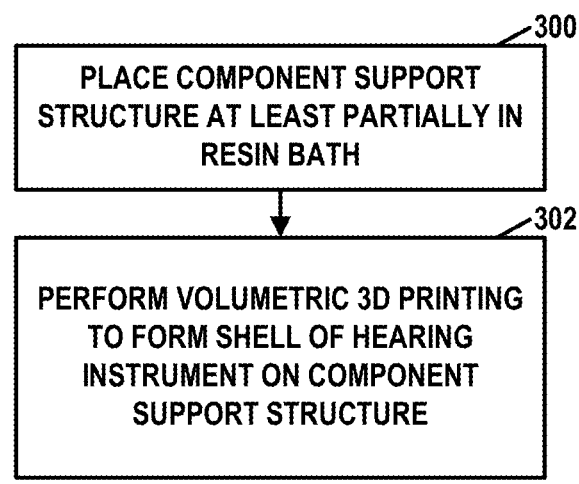
FIG. 3 is a flowchart illustrating an example operation for manufacturing a hearing instrument, in accordance with an example of this disclosure.

FIG. 3 is a flowchart illustrating an example operation for manufacturing a hearing instrument, in accordance with an example of this disclosure. Other examples of this disclosure may include more, fewer, or different actions. For ease of explanation, this disclosure generally describes the example operation of FIG. 3 with respect to FIG. 1, and with specific reference to hearing instrument 102A. However, the example operation of FIG. 3 may be performed with respect to other hearing instruments.

In the example of FIG. 3, 3D printing apparatus 106 places a component support structure at least partially in a bath of a resin liquid (300). For instance, in some examples, the component support structure is placed entirely in the bath of the resin liquid. In other examples, only a portion of the component support structure is placed in the bath of the resin liquid.

One or more operative components of a hearing instrument (e.g., hearing instruments 102A, 102B, hearing instrument 200, etc.) are attached to or contained within the component support structure prior to the component support structure being at least partially placed in the bath of the resin liquid. Examples of operative components of hearing instrument 102A may include storage device(s) 202, communication units 204 (including antennas), receiver 206, processor(s) 208, microphones 210, sensors 212, power source 214, communication channels 216, power supply connectors 217, and so on.

As described in greater detail elsewhere in this disclosure, the component support structure may be realized in one of various ways. For example, the component support structure may comprise a scaffold to which the one or more operative components of hearing instrument 102A are attached prior to and during placement of the component support structure in the resin bath. In some examples, the component support structure may comprise a set of rigid wires that hold the operative components in position relative to one another.

3D printing apparatus 106 may place the component support structure in the resin bath in one of a variety of ways. For instance, in one example, 3D printing apparatus 106 may include a mechanical arm that lowers the component support structure into the resin bath. In another example, the component support structure may be placed into a container (e.g., by a person or a mechanical arm of 3D printing apparatus 106) and 3D printing apparatus 106 (or another device) may pour or otherwise inject a resin liquid into the container, thereby placing the component support structure into a resin bath. In another example, 3D printing apparatus 106 may suspend the component support structure over a container containing resin liquid and may lift the container upward so that at least part of the component support structure is immersed in the resin liquid, thereby placing the component support structure in a resin bath.

Figure 4:
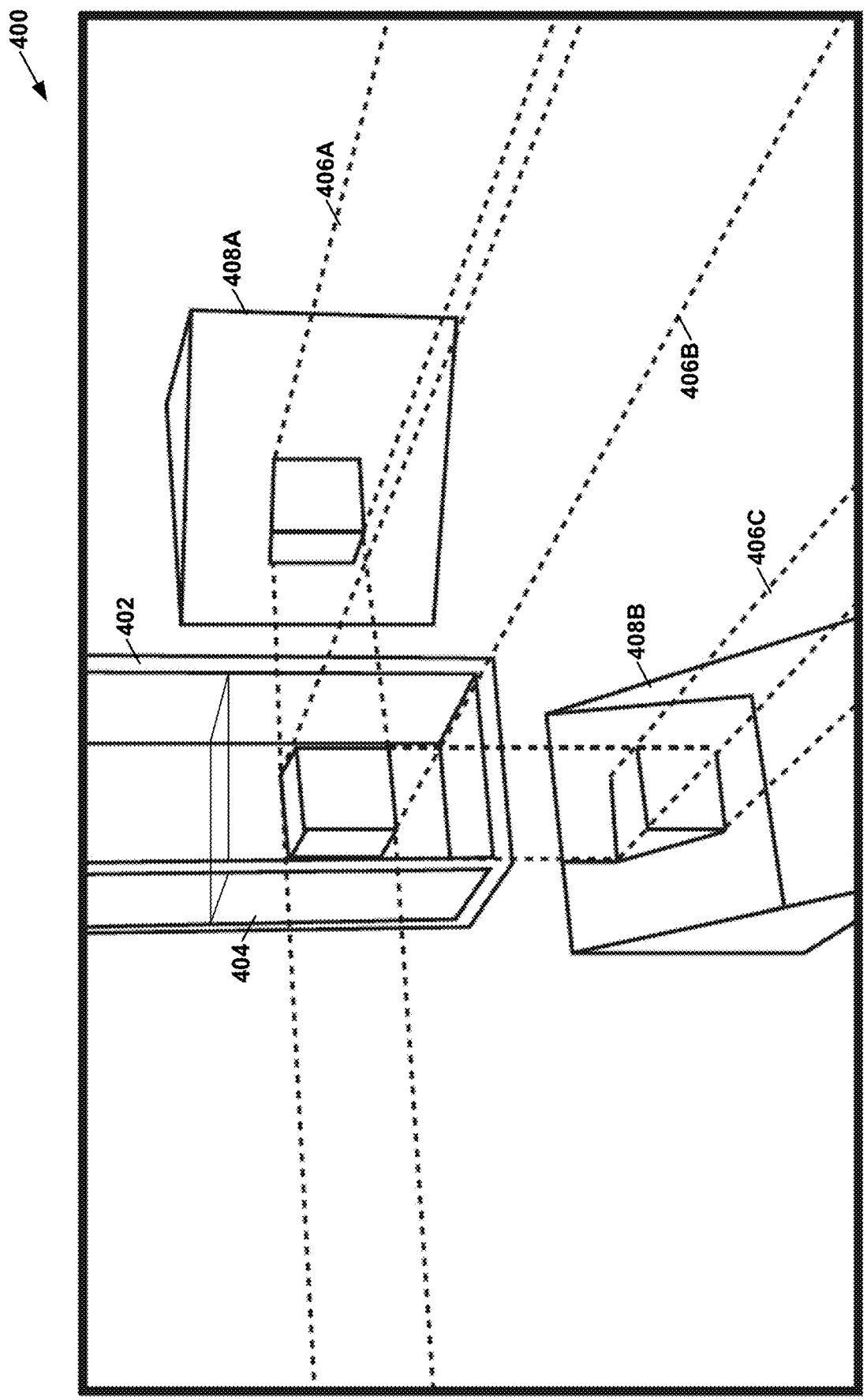
FIG. 4 is a conceptual diagram illustrating an example holographic lithography technique for volumetric 3-dimensional (3D) printing.
Figure 5:
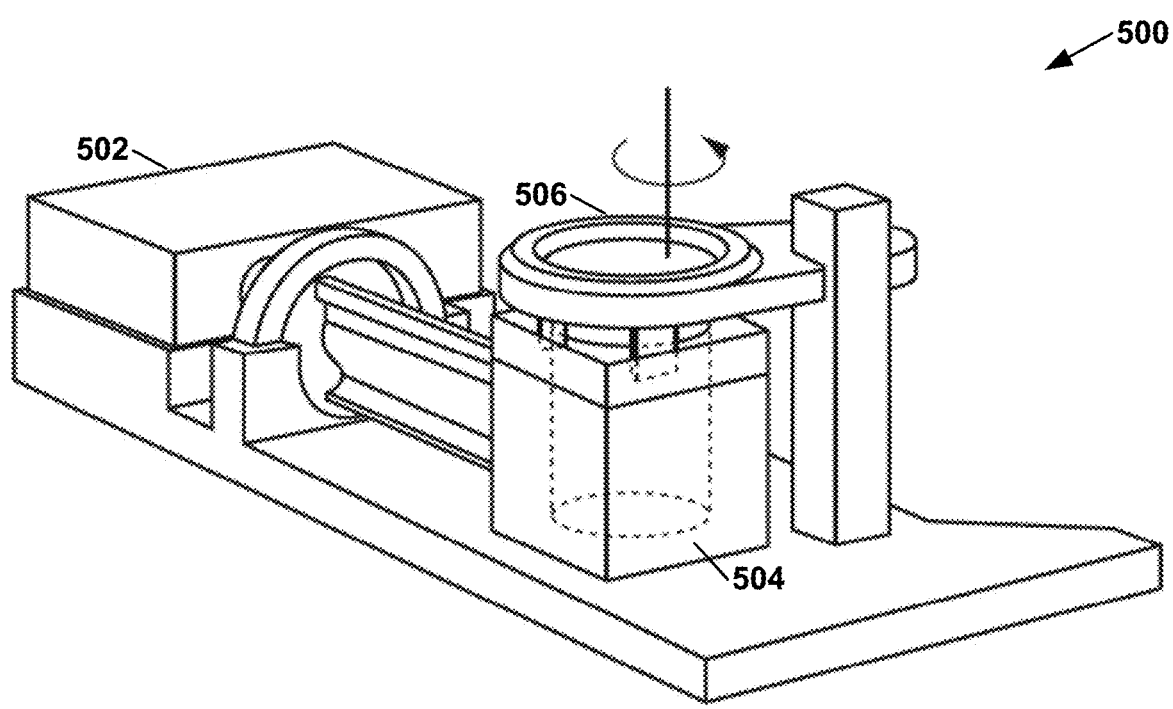
FIG. 5 is a diagram illustrating an example 3D printing apparatus that uses axial lithography for volumetric 3D printing.

Furthermore, in the example of FIG. 3, while the component support structure is at least partially in the resin bath, 3D printing apparatus 106 may perform volumetric 3D printing to form a shell of hearing instrument 102A attached to the component support structure (302). In different examples of this disclosure, different volumetric 3D printing techniques may be performed to form the shell of hearing instrument 102A. For instance, the example of FIG. 4 illustrates a holographic lithography technique for volumetric 3D printing to form the shell of hearing instrument 102A. The example of FIG. 5 illustrates an axial lithography technique for volumetric 3D printing to form the shell of hearing instrument 102A.

As noted above, 3D printing apparatus 106 may perform volumetric 3D printing to form a shell of hearing instrument 102A attached to the component support structure. In some examples, the 3D-printed shell of hearing instrument 102A may be customized to a specific user. For instance, the shape of the 3D-printed shell of hearing instrument 102A may be formed specifically to fit a user's unique ear geometry. In other examples, the 3D-printed shell of hearing instrument 102A may be semi-customized. For instance, the 3D-printed shell of hearing instrument 102A may be shaped to conform to one of a plurality of hearing instrument shell shapes, one of which may be best suited for a user. In some such examples, a semi-customized shell may be formed by modifying such a 3D-printed shell to fit a specific user (e.g., by grinding, shaving, polishing, etc., the shell to fit the specific user).

In some examples, prior to using volumetric 3D printing to form the shell of the hearing instrument and after the component support structure is placed in the resin bath, 3D printing apparatus 106 may perform a registration process to determine a position within the resin bath of the component support structure and/or one or more of the operative components attached thereto. For example, 3D printing apparatus 106 may use one or more lasers to identify one or more optical landmarks on the component support structure and/or the one or more operative components attached thereto. Example types of optical landmarks may include spots, patterns, ridges, etc. Based on the positions of the landmarks, 3D printing apparatus 106 may determine a rotational orientation of the component support structure and/or the one or more operative components attached thereto. In some examples, 3D printing apparatus 106 may rotate the component support structure based on the rotational orientation of the component support structure. Additionally, 3D printing apparatus 106 may use one or more lasers to determine a distance to the landmarks. In this way, 3D printing apparatus 106 may determine a position of the component support structure (along with the attached operative components) within the resin bath. Based on the position of the component support structure, 3D printing apparatus 106 may translate and/or rotate a coordinate system of a virtual model of the shell accordingly and use the resulting coordinates as locations for 3D printing the shell.

FIG. 4 is a conceptual diagram illustrating an example holographic lithography technique for volumetric 3D printing. The holographic lithography technique for volumetric 3D printing may also be referred to as holographic printing or tomographic printing. In general, to perform holographic lithography, a 3D printing apparatus 400 uses three light beams to illuminate a volume within a resin liquid bath. 3D printing apparatus 400 may be an instance of 3D printing apparatus 106 (FIG. 1). It is only at the intersections of the three light beams that there is enough energy to cause polymerization to occur in the resin liquid. As the three light beams are moved in the resin liquid bath, areas within the resin bath concurrently exposed to all three light beams polymerize to create a solid 3D object. Advantageously, the holographic lithography technique does not result in a layered texture or appearance, as is common in layer-by-layer 3D printing techniques.

Specifically, in the example of FIG. 4, a container 402 contains a resin bath 404. A laser beam is patterned by a spatial light modulator of 3D printing apparatus 400 and split into three light beams 406A, 406B, and 406C (collectively, "light beams 406"). Each of light beams 406A, 406B, and 406C may represent a view of an object 408 from a different direction, where the object is the object to be printed, such as a shell of hearing instrument. In the example of FIG. 4, prism mirrors 410A, 410B of 3D printing apparatus 400 direct light beams 406A, 406C into the resin bath 404.

FIG. 5 is a diagram illustrating an example 3D printing apparatus 500 that uses axial lithography for volumetric 3D printing. In the example of FIG. 5, 3D printing apparatus 500 includes a digital light processing (DLP) projector 502, a resin liquid bath 504, and a rotation stage 506. In the example of FIG. 5, an object, such as a component support structure, may be suspended from rotation stage 506. Rotation stage 506 may rotate the component support structure within resin bath 504.

In the example of FIG. 5, DLP projector 502 is configured to output different patterns of light keyed to different rotational positions of rotation stage 506. The pattern of light keyed to a rotational position of rotation stage 506 corresponds to an image of the object to be printed, as seen from the rotational position. For example, a first image may correspond to a 2-dimensional (2D) image of an object as seen from angle $\theta i$, a second image may correspond to a 2D image of the object as seen from angle $\theta j$, a third image may correspond to a 2D image of the object as seen from angle $\theta k$, and so on. The pattern of light projected by DLP projector 502 may be consider a curtain of light whose intensity profile matches that of the object being printed. As resin bath 504 is rotated, the rotational speed, combined with the light curtain, control where exposure is sufficient to cause polymerization. Thus, as rotation stage 506 rotates the component support structure within resin bath 504, the object is formed.

Although various forms of photopolymerization are discussed in this disclosure, other types of polymerization may be used in certain volumetric 3D printing techniques. Example other types of polymerization may include thermal, electrical, or chemical polymerization techniques.

As mentioned above, a component support structure may be placed at least partially in a resin bath and volumetric 3D printing may be performed to form a shell of the hearing instrument attached to the component support structure. The support structure may be realized in one of a variety of ways.

FIGS. 6-17 are conceptual diagrams illustrating example ways that the support structure may be implemented.

Figure 6:
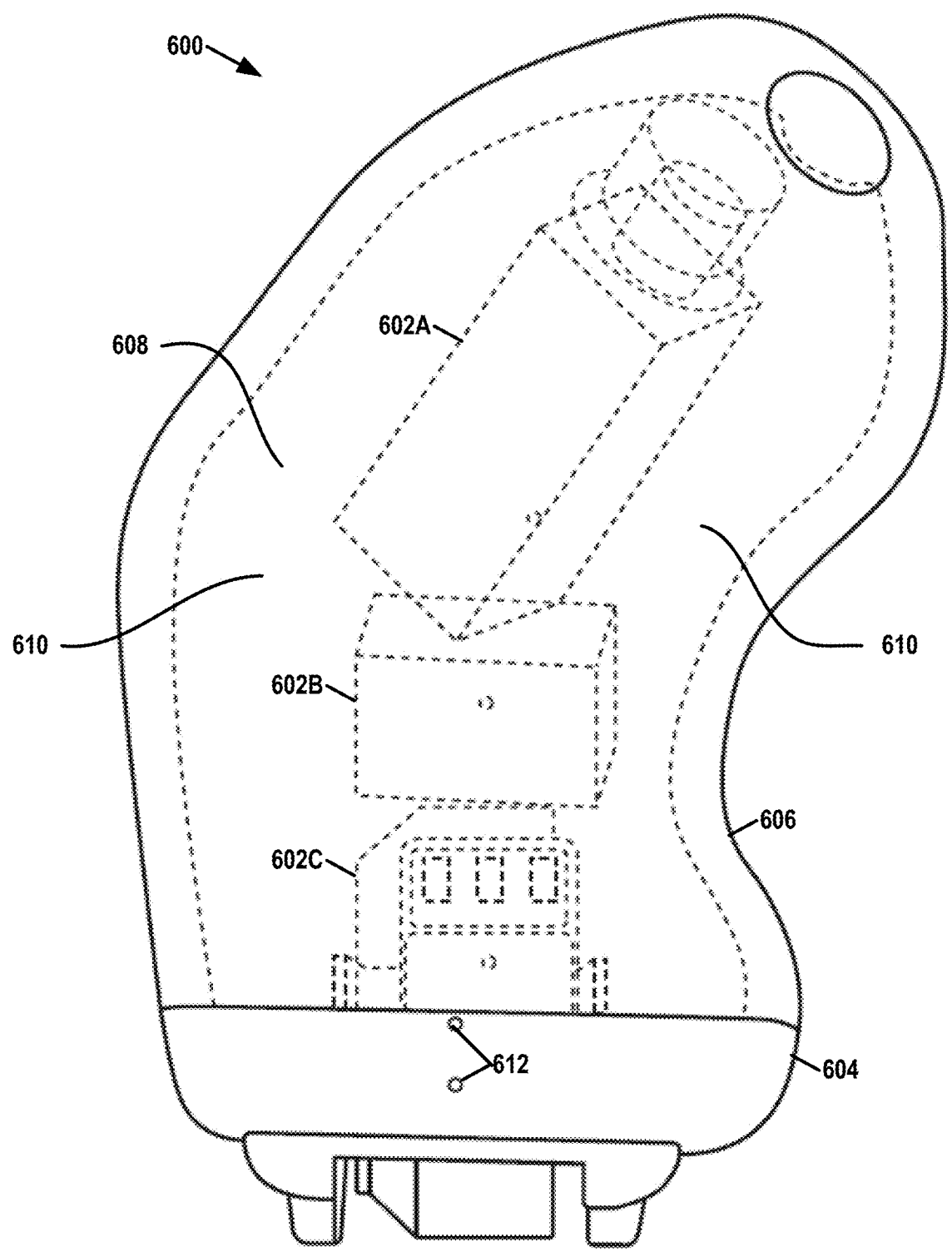
FIG. 6 is a conceptual diagram illustrating a cut-away view of a hearing instrument showing operative components, in accordance with one or more examples of this disclosure.

FIG. 6 is a conceptual diagram illustrating a cut-away view of a hearing instrument 600 showing operative components, in accordance with one or more examples of this disclosure. Hearing instrument 600 may be an example of one of hearing instruments 102 (FIG. 1), hearing instrument 200 (FIG. 2), or another hearing instrument. Hearing instrument 600 includes a set of operative components 602. In the example of FIG. 6, the operative components 602 of hearing instrument 600 include a receiver 602A, a set of processors 602B, and a sensor package 602C. Sensor package 602C may include sensors (e.g., sensors 212 (FIG. 2)) and/or microphones (e.g., microphone(s) 210 (FIG. 2)).

The operative components 602 are connected to a faceplate 604 of hearing instrument 600. Faceplate 604 may contain one or more operative components of hearing instrument 600 and/or one or more operative components of hearing instrument 600 may be connected to faceplate 604. When a user is using hearing instrument 600, faceplate 604 may be positioned at a lateral end of the user's ear canal. Furthermore, as shown in the example of FIG. 6, hearing instrument 600 includes a shell 606 that is shaped to accommodate a curve of the user's ear canal. Shell 606 defines an interior cavity 608 that is partially occupied by operative components 602. Faceplate 604 covers an open end of interior cavity 608.

In the example of FIG. 6, a major axis of receiver 602A is at a non-perpendicular angle relative to faceplate 604. Receiver 602A may need to have this non-perpendicular angle relative to faceplate 604 because of the constraints imposed by the shape of the user's ear canal as well as achieving an objective of directing sound along an axis of the user's ear canal. In order to assemble hearing instrument 600, interior cavity 608 may need to be wide enough to accommodate receiver 602A at all points as receiver 602A and the other operative components 602 of hearing instrument 600 are inserted into interior cavity 608 of shell 606. Note however that because receiver 602A is at a non-perpendicular angle relative to faceplate 604, interior cavity 608 of shell 606 may need to be wider at specific points than any of operative components 602. Thus, after operative components 602 are inserted into interior cavity 608 of shell 606, there may be unused space 610 within interior cavity 608 that is not occupied by any operative component of hearing instrument 600.

However, it may be desirable to include additional operative components or use larger operative components that occupy unused space 610 within hearing instrument 600. The additional operative components or larger operative components may enhance the functionality of hearing instrument 600. For instance, a larger battery may be used to extend the operating life of hearing instrument 600 or power additional features. In another example, the additional operative components may include additional sensors or more powerful processors. However, using conventional techniques, it may not be possible to include additional or larger operative components within the unused space 610. Alternatively, reducing unused space may allow for the overall reduction in size of the hearing instrument, which may enable deeper seating of the hearing instrument within the user's ear canal, making the hearing instrument less visible.

Hence, in accordance with the examples of this disclosure, 3D printing apparatus 106 (FIG. 1) may use volumetric 3D printing to form shell 606 around operative components 602 while one or more of operative components 602 are connected to faceplate 604 via a component support structure (not shown in FIG. 6). Because shell 606 is formed around operative components 602 and the component support structure, it is not necessary to insert operative components 602 into interior cavity 608 of shell 606. Thus, a designer of hearing instrument 600 may not be obliged to include unused space 610 in interior cavity 608 in order to allow for the insertion of operative components 602 into interior cavity 608. Rather, the designer of hearing instrument 600 may design hearing instrument 600 to include other and/or larger operative components that occupy what was previously unused space 610.

Thus, in accordance with some examples of this disclosure, as part of using volumetric 3D printing to form shell 606, faceplate 604 may be placed into a resin bath and 3D printing apparatus 106 may use laser registration to determine a position of faceplate 604. For example, 3D printing apparatus 106 may use one or more lasers to identify one or more optical landmarks 612 on faceplate 604 (e.g., spots, patterns, ridges, etc.). Based on the positions of the landmarks, 3D printing apparatus 106 may determine a rotational orientation of faceplate 604. In some examples, 3D printing apparatus 106 may rotate faceplate 604 based on the rotational orientation of faceplate 604. Additionally, 3D printing apparatus 106 may use the one or more lasers to determine a distance to the landmarks. In this way, 3D printing apparatus 106 may determine a position of faceplate 604 (along with the attached operative components) within the resin bath. Based on the position of faceplate 604, 3D printing apparatus 106 may translate and/or rotate a coordinate system of a virtual model of shell 606 accordingly and use the resulting coordinates as locations for 3D printing shell 606.

In some examples, a gluing step may be performed (e.g., by a person or machine) to attach to faceplate 604 to shell 606. Furthermore, in some examples, to hold faceplate 604 and shell 606 together, one or more indentation features may be defined in faceplate 604 that allow entry of resin liquid. 3D printing apparatus 106 may polymerize the resin liquid in the indentation features during the process to print shell 606, thereby improving adhesion contact between faceplate 604 and shell 606. In some examples, such as examples where faceplate 604 is not user-specific, excess material of faceplate 604 may be removed (e.g., by a person or machine), potentially followed by a step of buffing faceplate 604 and shell 606 to create a cosmetically appealing and smooth device finish.

In some examples, 3D printing apparatus 106 (or another 3D printing apparatus) may perform 3D printing to form a user-specific faceplate 604 in a shape for exact matching to a shell 606. This may reduce or eliminate the need for removing of excess material of faceplate 604. Furthermore, in some examples, faceplate 604 may be left in a "green state" (i.e., not fully polymerized) and a separate step of applying an adhesive to bond faceplate 604 to shell 606 may be eliminated.

Figure 7:
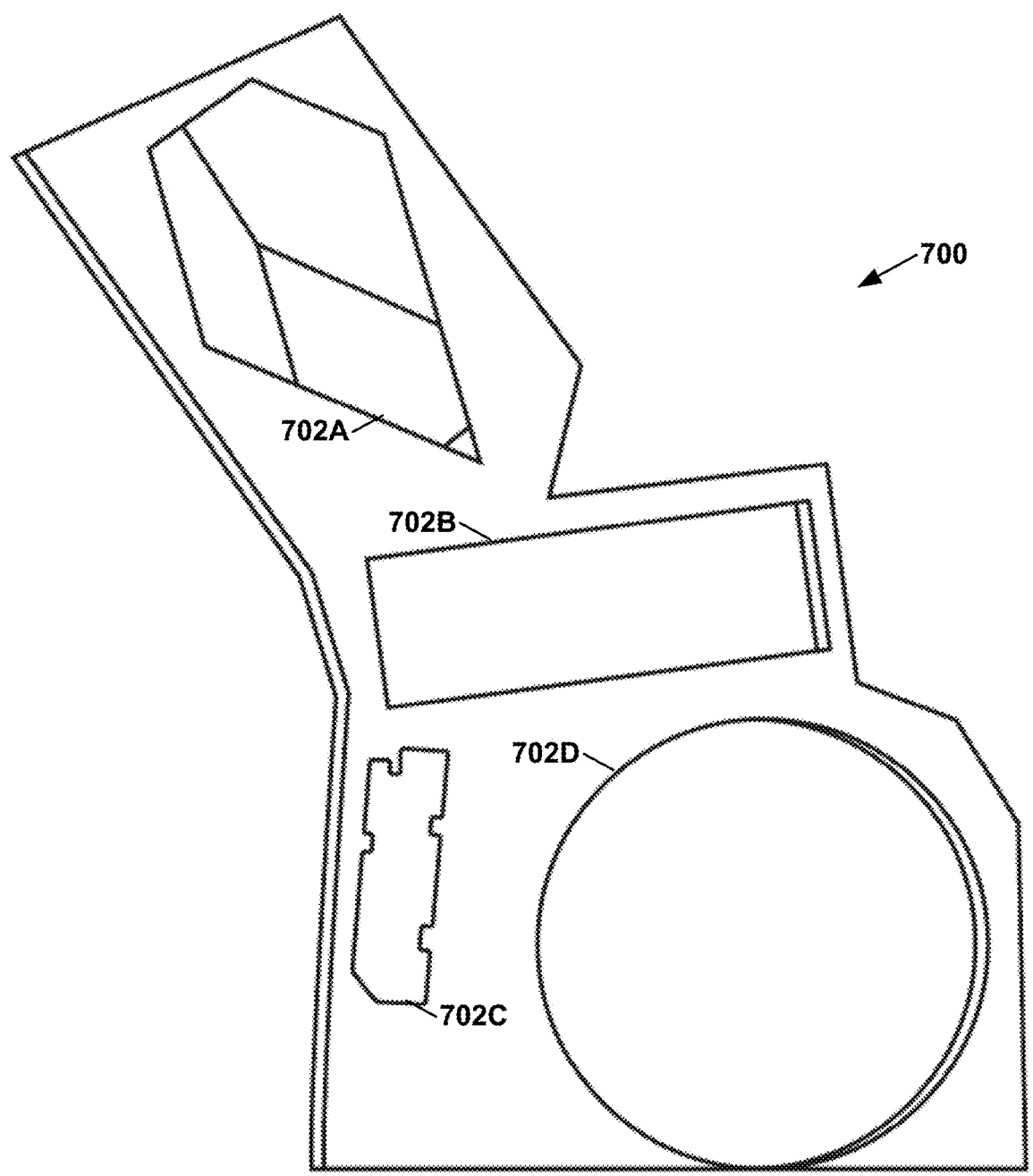
FIG. 7 is a conceptual diagram illustrating an example component support structure in accordance with one or more examples of this disclosure.

FIG. 7 is a conceptual diagram illustrating an example component support structure 700 in accordance with one or more examples of this disclosure. In the example of FIG. 7, component support structure 700 is a 3D structure that defines a set of apertures 702A, 702B, 702C, and 702D (collectively, "apertures 702"). Each of apertures 702 may be shaped and positioned to hold one or more operative components of a hearing instrument at fixed positions relative to one another. For example, aperture 702A may be shaped and positioned to hold a receiver (e.g., receiver 206 (FIG. 2)), aperture 702B may be shaped and positioned to hold a set of processors (e.g., processor(s) 208 (FIG. 2)), aperture 702C may be shaped and positioned to hold a sensor package (e.g., sensors 212 (FIG. 2)) or a set of communication units (e.g., communication units 204 (FIG. 2)), and aperture 702D may be shaped and positioned to hold a power source (e.g., power source 214 (FIG. 2)). Operative components of a hearing instrument may be inserted (e.g., manually or via a machine) into apertures 702 prior to the operative components and component support structure 700 being at least partially placed in a resin bath.

In some examples, electrical connection traces may be formed on component support structure 700 prior to the operative components being inserted into apertures 702. Example electrical connection traces may include communication channels 216 (FIG. 2) and/or power supply connectors 217 (FIG. 2).

Component support structure 700 may be formed of one or more types of materials. For instance, in some examples, component support structure 700 may be formed from a plastic. Thus, in such examples, component support structure 700 may be considered to be a plastic "tree" structure that is pre-printed based on placement or location requirements. In some examples, component support structure 700 may be formed from a metal. In some examples, component support structure 700 may be formed from a composite of materials.

In some examples, component support structure 700 may be formed from a set of one or more rigid wires. In such examples, component support structure 700 may comprise wiring that connects operative components such that the operative components retain their relative positions. In some examples, one or more of the wires carry at least one of power or communication between two or more of the operative components. A custom or standard auxiliary support structure may facilitate wire bending in the desired position. In other words, the auxiliary support structure may bend the wires of component support structure 700 into a desired shape. In some examples, a 3D printing apparatus may perform 3D printing to form the wires of component support structure 700 on the auxiliary support structure. The auxiliary support structure may subsequently be discarded, leaving behind just the wires of the component support structure 700.

Furthermore, component support structure 700 may be formed in one of a variety of ways. For instance, in some examples, component support structure 700 is 3D printed in a 3D printing process separate from a 3D printing process to print a shell of a hearing instrument. In such examples, the 3D printing process to print component support structure 700 may be a volumetric 3D printing process, a layer-by-layer 3D printing process, or another type of 3D printing process. In other examples, component support structure 700 may be formed using one or more of an injection molding process, a stamping process, a bending process, and/or one or more other processes. In some examples, one or more parts of component support structure 700 may be soldered or otherwise attached to one another to form component support structure 700.

In some examples, component support structure 700 may be custom 3D printed for each hearing instrument. Thus, component support structures may be user specific. In some examples, component support structure 700 may be developed at a computer assisted design (CAD) station and an operator may design component support structure 700 in a manner that does not need to account for manufacturing processes that require insertion of components into a shell. This may result in hearing instruments that are smaller than conventional hearing instruments.

Figure 8:
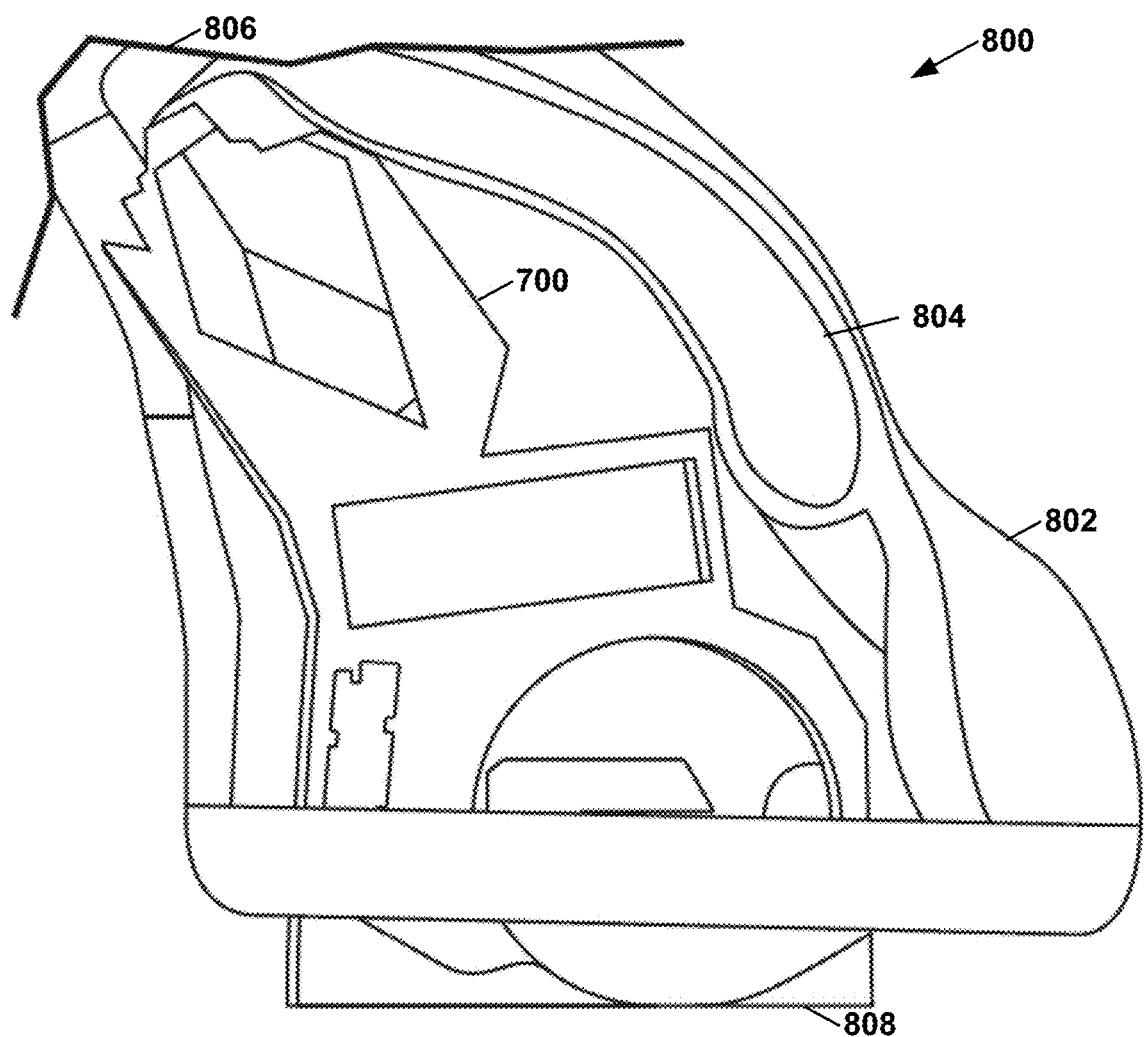
FIG. 8 is a conceptual diagram illustrating an example cutaway view of a hearing instrument showing the component support structure of FIG. 7 inside a volumetrically 3D printed shell of the hearing instrument, in accordance with one or more examples of this disclosure.

FIG. 8 is a conceptual diagram illustrating an example cutaway view of a hearing instrument 800 showing component support structure 700 of FIG. 7 inside a volumetrically 3D printed shell 802 of hearing instrument 800, in accordance with one or more examples of this disclosure. As shown in the example of FIG. 8, shell 802 may be 3D printed to define a vent 804 passing from a medial end 806 of hearing instrument 800 to a distal end 808 of hearing instrument 800.

Figure 9:
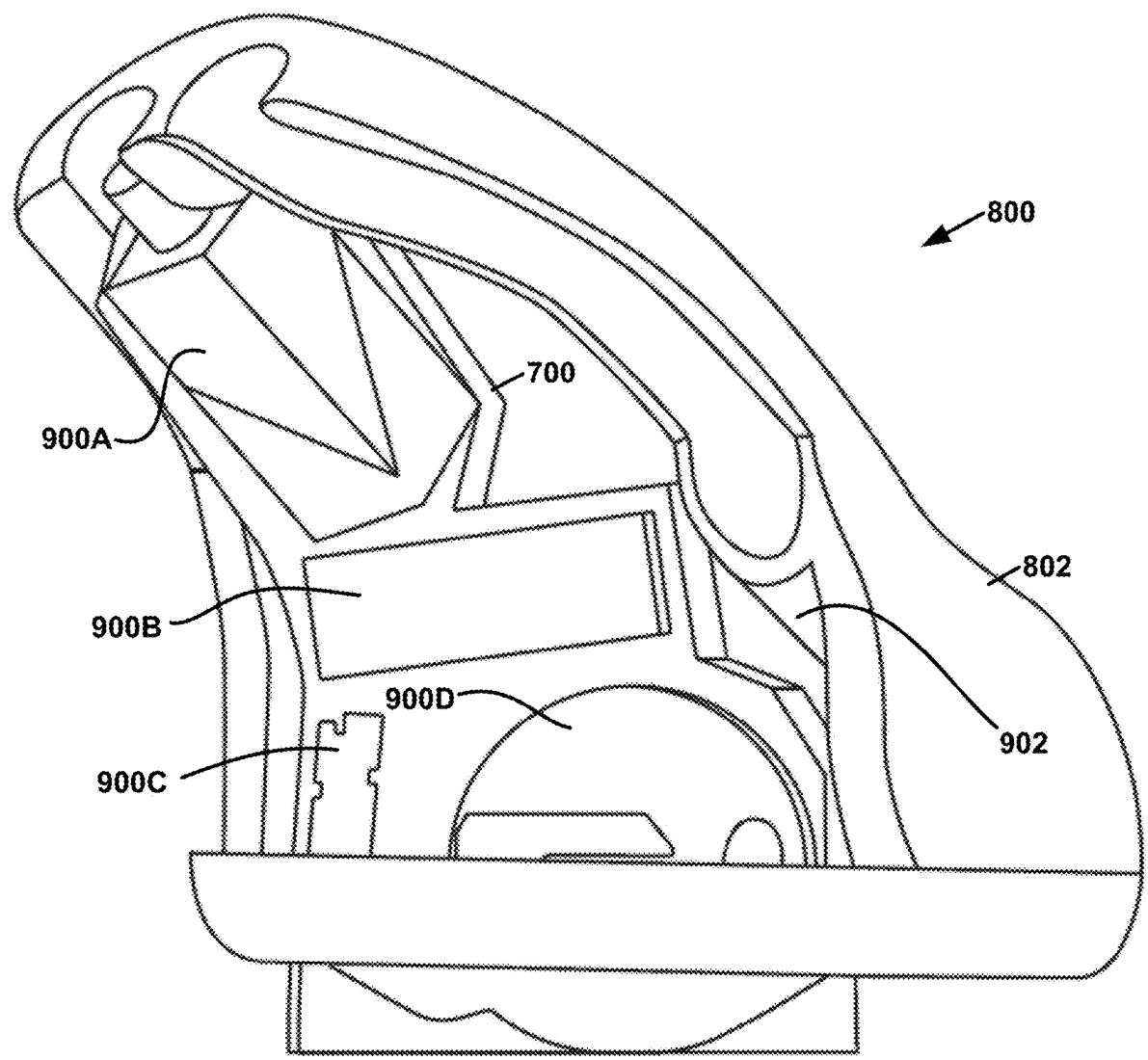
FIG. 9 is a conceptual diagram illustrating an example cutaway view of the hearing instrument of FIG. 8 showing the component support structure of FIG. 7 with attached operative components, in accordance with one or more examples of this disclosure.

FIG. 9 is a conceptual diagram illustrating an example cutaway view of hearing instrument 800 of FIG. 8 showing component support structure 700 of FIG. 7 with attached operative components, in accordance with one or more examples of this disclosure. As shown in the example of FIG. 9, components 900A, 900B, 900C, and 900D are located within an interior cavity 902 defined by shell 802.

Figure 10A:
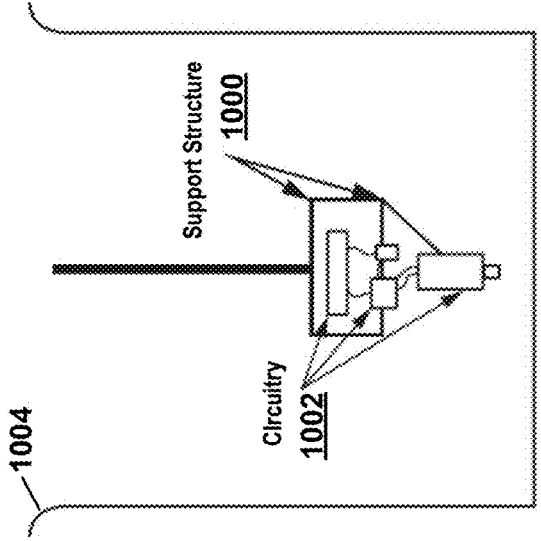
FIG. 10A, FIG. 10B, and FIG. 10C are conceptual diagrams illustrating an example construction technique for a hearing instrument, in accordance with one or more examples of this disclosure.
Figure 10B:
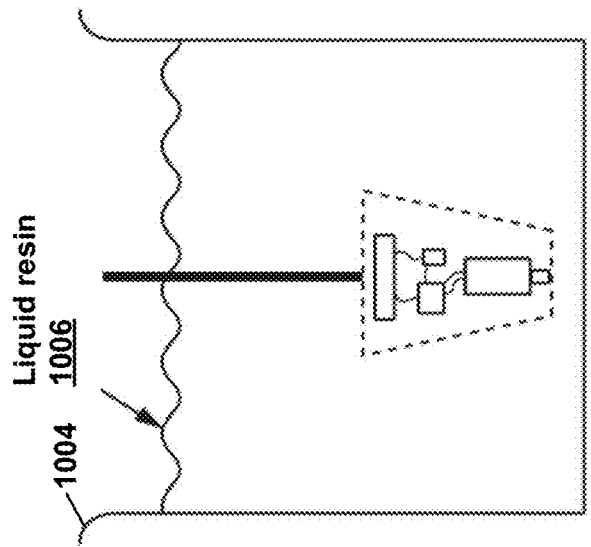
Figure 10C:
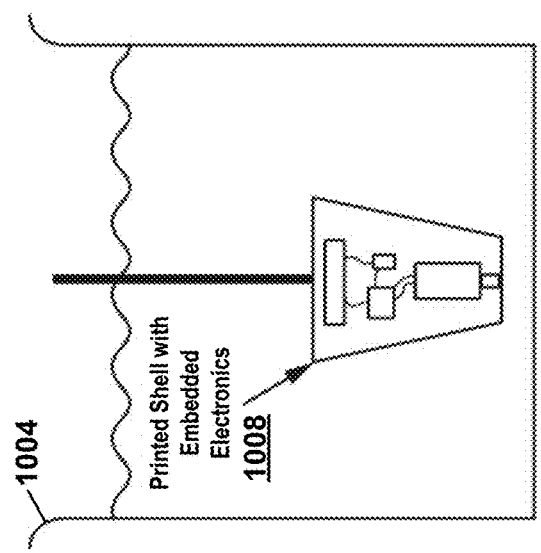

FIG. 10A, FIG. 10B, and FIG. 10C are conceptual diagrams illustrating an example construction technique for a hearing instrument, in accordance with one or more examples of this disclosure. As shown in the example of FIG. 10A, a support structure 1000 with attached circuitry 1002 is placed in a container 1004. Circuitry 1002 may include various operative components, such as processors, batteries, sensors, receivers, and so on. As shown in the example of FIG. 10B, a resin liquid is added to container 1004. As shown in the example of FIG. 10C, a 3D printing apparatus performs volumetric 3D printing to form a 3D printed shell 1008 around support structure 1000 and circuitry 1002.

Although not shown in the examples of FIG. 10A through FIG. 10C, a printed shell with embedded electronics 1008 may be placed within another container of a liquid material that has different properties than resin liquid 1006. For instance, if it is desired to have a multi-material or multi-durometer material shell, the printed shell with embedded electronics 1008 may be placed within another container of a different resin liquid. The 3D printing apparatus may then perform volumetric 3D printing to form one or more additional structures. For example, 3D printing apparatus may perform volumetric 3D printing to form a more aesthetically appealing surface coat on shell 1008. For instance, the surface coat may have a color matched to a user's skin tone.

Figure 11:
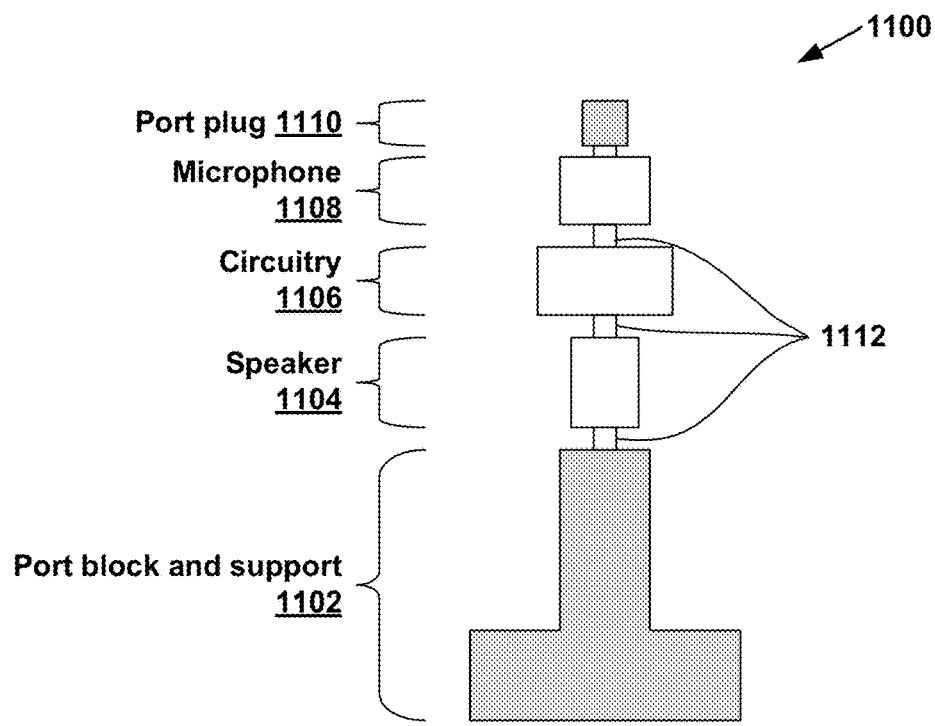
FIG. 11 is a conceptual diagram illustrating an example arrangement of components, in accordance with one or more examples of this disclosure.

FIG. 11 is a conceptual diagram illustrating an example arrangement 1100 of components, in accordance with one or more techniques of this disclosure. As illustrated in the example of FIG. 11, the components include a port block and support 1102, a speaker 1104, circuitry 1106, microphone 1108, a port plug 1110, and a component support structure 1112. Arrangement 1100 may be placed, as a unit, into a resin bath and 3D printing apparatus 106 may print a hearing instrument shell around at least some of the components. Circuitry 1106 may include one or more processors (e.g., processors 208 (FIG. 2), processors 602B (FIG. 6), or processors 900B (FIG. 9)). Although not shown in the example of FIG. 11, arrangement 1100 may include one or more other components, such as a power source, communication units, etc. Port block and support 1102 may support speaker 1104, circuitry 1106, microphone 1108, port plug 1110, and component support structure 1112 during the 3D printing process.

In the example of FIG. 11, speaker 1104 may be a component of a receiver (e.g., receiver 206 (FIG. 2), receiver 602A (FIG. 6), receiver 900A (FIG. 9), etc.) that generates sound. Because speaker 1104 generates sound, speaker 1104 has an opening and the shell defines an aperture through which the sound passes into the user's ear canal. Speaker 1104 may be damaged by contact with the resin liquid. Accordingly, port block and support 1102 may block the opening of speaker 1104 as well as support speaker 1104, circuitry 1106, microphone 1108, port plug 1110 and component support structure 1112. The port block portion of port block and support 1102 may also define the aperture of the shell through which sound passes into the user's ear canal.

Microphone 1108 may include microphone 210 (FIG. 2). Microphone 1108 detects sound. Accordingly, microphone 1108 has an opening and the shell defines an aperture through which the sound passes from the user's environment. Like speaker 1104, microphone 1108 may be damaged by contact with the resin liquid. Accordingly, port plug 1110 is attached to microphone 1108 to prevent the resin liquid from entering the opening of microphone 210. Moreover, port plug 1110 may help to define the aperture of the shell through which sound passes from the user's environment. Port plug 1110 may be formed from a solid plastic cap, closed-cell foam, or another material.

Thus, in some examples of this disclosure, a hearing instrument (e.g., one of hearing instruments 102, hearing instrument 200, etc.) may include a transducer (e.g., a microphone or a speaker) and after 3D printing apparatus 106 performs volumetric 3D printing to form the shell, the hearing instrument may be removed from the bath. After removing the hearing instrument from the bath, a plug (e.g., port plug 1110) covering an opening of the transducer may be removed (e.g., by a person or machine).

Figure 12:
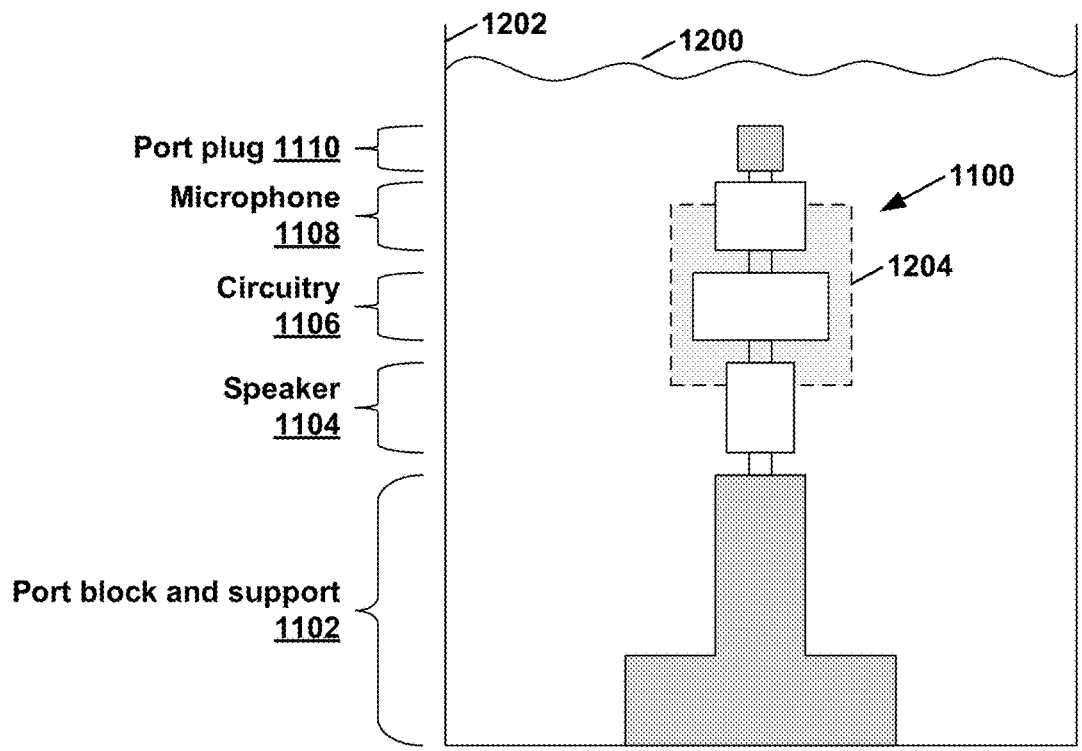
FIG. 12 is a conceptual diagram illustrating the arrangement of FIG. 11 immersed in a resin bath, in accordance with one or more examples of this disclosure.

FIG. 12 is a conceptual diagram illustrating arrangement 1100 immersed in a resin bath 1200, in accordance with one or more examples of this disclosure. As shown in the example of FIG. 12, a lower portion of port block and support 1102 may rest on a bottom of a container 1202. Container 1202 may be an instance of container 1004 (FIGS. 10A-10C). Furthermore, in the example of FIG. 12, a 3D printing apparatus may form a shell 1204 that contains circuitry 1106 and at least portions of speaker 1104 and microphone 1108.

Figure 13:
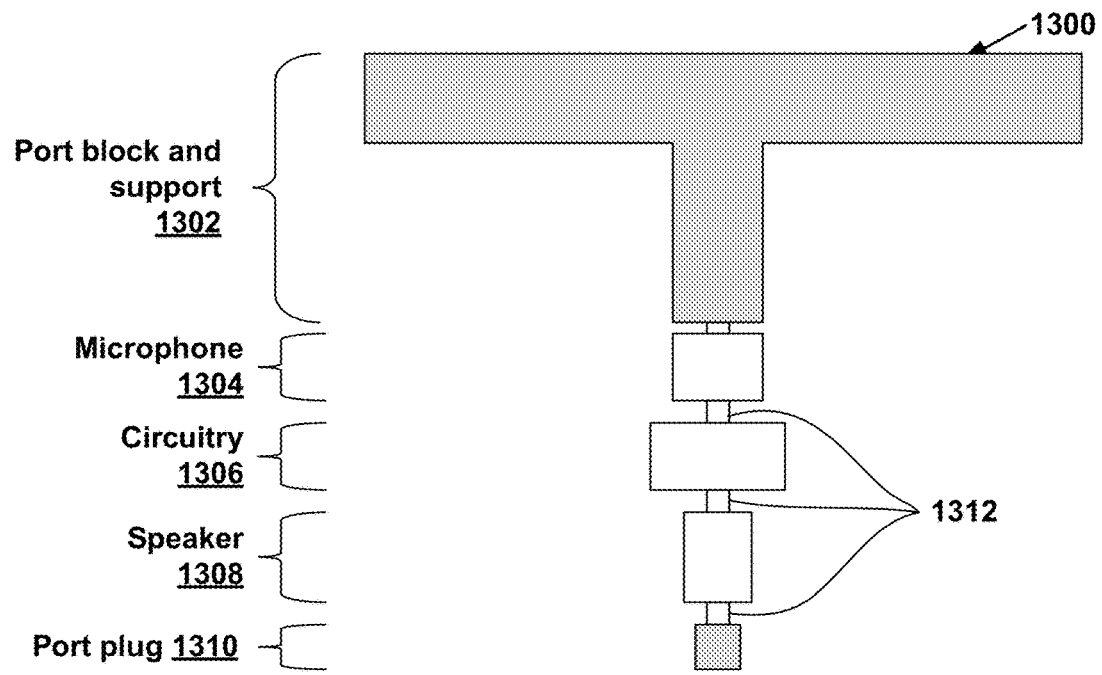
FIG. 13 is a conceptual diagram illustrating an example arrangement of components, in accordance with one or more examples of this disclosure.

FIG. 13 is a conceptual diagram illustrating an example arrangement 1300 of components, in accordance with one or more examples of this disclosure. As illustrated in the example of FIG. 13, the components include a port block and support 1302, a microphone 1304, circuitry 1306, a speaker 1308, a port plug 1310, and a component support structure 1312. Arrangement 1300 may be placed, as a unit, into a resin bath and 3D printing apparatus 106 may print a hearing instrument shell around at least some of the components. Microphone 1304, circuitry 1306, speaker 1308, port plug 1310, and component support structure 1312 may be implemented in a similar manner as corresponding components in FIG. 11.

Figure 14:
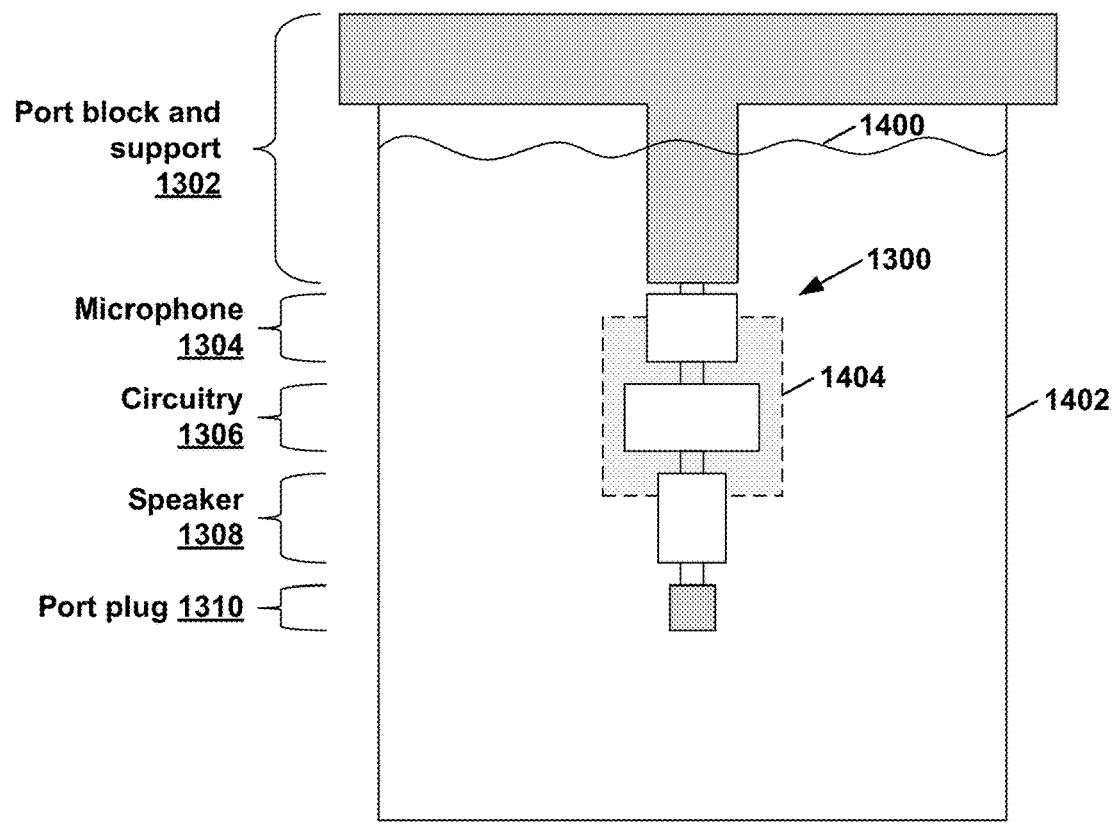
FIG. 14 is a conceptual diagram illustrating the example arrangement of FIG. 13 immersed in a resin bath, in accordance with one or more examples of this disclosure.

However, in contrast to arrangement 1100 of FIG. 11, the components of arrangement 1300 are suspended from port block and support 1302 rather than being supported from below. Thus, as shown in the example of FIG. 14, arrangement 1300 may be placed into a resin bath 1400 within a container 1402. A 3D printing apparatus may perform volumetric 3D printing to form a shell 1404 that contains circuitry 1306 and at least portions of microphone 1304 and speaker 1308.

Figure 15:
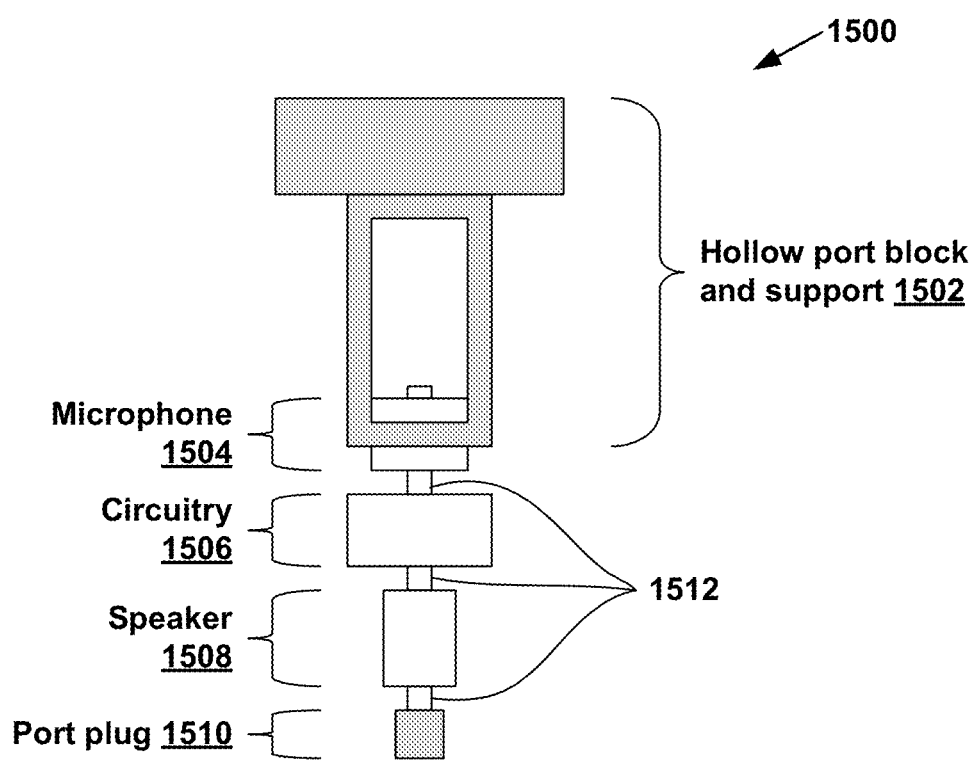
FIG. 15 is a conceptual diagram illustrating an example arrangement of components, in accordance with one or more examples of this disclosure.

FIG. 15 is a conceptual diagram illustrating an example arrangement 1500 of components, in accordance with one or more examples of this disclosure. As illustrated in the example of FIG. 15, the components include a hollow port block and support 1502, a microphone 1504, circuitry 1506, a speaker 1508, a port plug 1510, and a component support structure 1512. Arrangement 1500 may be placed, as a unit, into a resin bath and 3D printing apparatus 106 may print a hearing instrument shell around at least some of the components. Microphone 1504, circuitry 1506, speaker 1508, port plug 1510, and component support structure 1512 may be implemented in a similar manner as corresponding components in FIG. 11. Similar to the examples of FIG. 13 and FIG. 14, microphone 1504, circuitry 1506, speaker 1508, port plug 1510 and component support structure 1512 are suspended from port block and support 1502. In other examples, a port block and support similar to port block and support 1502 may support microphone 1504, circuitry 1506, speaker 1508, port plug 1510 and component support structure 1512 from beneath, similar to the examples of FIG. 11 and FIG. 12. In the example of FIG. 15, port block and support 1502 is hollow instead of solid, as shown in the examples of FIG. 11 through FIG. 14. After removal of the arrangement 1500 from the resin bath, the opening of microphone 1504 may be exposed by trimming off portions of port block and support 1502 that remain outside the 3D printed shell.

Thus, in the examples of FIG. 11 through FIG. 15, the operative components of a hearing instrument may include a transducer (e.g., speaker 1104, microphone 1108, microphone 1304, speaker 1308, microphone 1504, speaker 1508, etc.). In the examples of FIG. 11 through FIG. 15, the component support structure (e.g., component support structure 1112 or component support structure 1312) and one or more operative components are supported by or suspended from a support (e.g., port block and support 1102, port block and support 1302) while the component support structure is at least partially in the bath. In such examples, the support prevents entry of the resin liquid into an opening of the transducer. In some such examples (e.g., the example of FIG. 15), the support defines a void aligned with the opening of the transducer (e.g., microphone 1504 or in another example speaker 1508). In such examples, after removing the hearing instrument from the bath, a portion of the support outside the shell may be removed (e.g., by a person or machine) while leaving a portion of the support connected to the shell. In some examples, a system for manufacturing the hearing instrument may include a tool configured to remove the portion of the support outside the shell. The tool may include a slicing blade, scissors, a grinding surface, or another type of tool.

Figure 16:
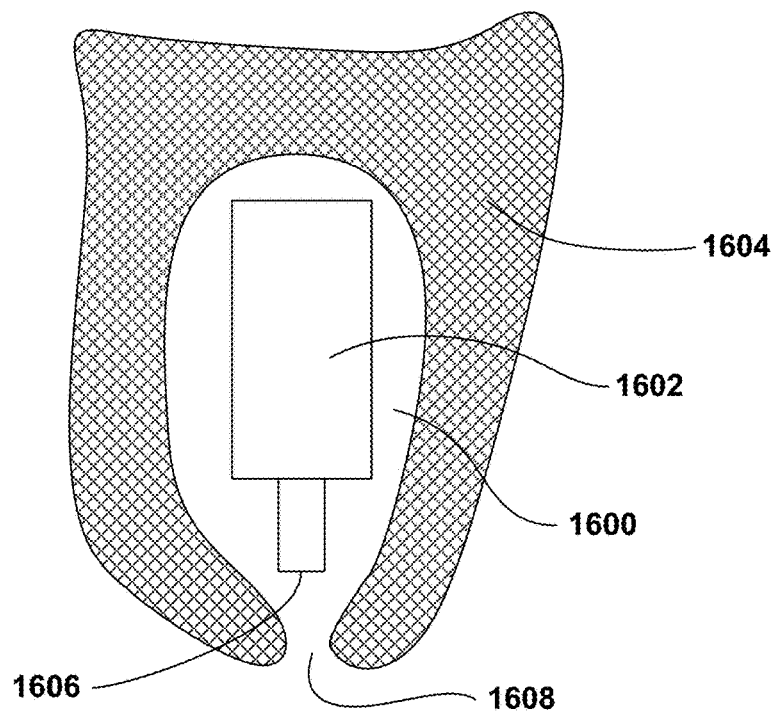
FIG. 16 is a conceptual diagram illustrating an example air void formed around a speaker, in accordance with one or more examples of this disclosure.

FIG. 16 is a conceptual diagram illustrating an example air void 1600 formed around a speaker 1602, in accordance with one or more examples of this disclosure. Acoustic feedback may occur when a microphone of a hearing instrument detects sound or vibration caused by a speaker of the hearing instrument. For instance, vibrations caused by the speaker may travel through the shell or other components of the hearing instrument to the microphone of the hearing instrument. This acoustic feedback may be annoying or uncomfortable to a user of the hearing instrument. Accordingly, to prevent acoustic feedback, the speaker of the hearing instrument should be physically isolated from the shell and other internal components of the hearing instrument.

As illustrated in the example of FIG. 16, a 3D printing apparatus may perform volumetric 3D printing to form shell 1604 such that air void 1600 surrounds speaker 1602. In other words, shell 1604 does not directly contact speaker 1602, which may prevent vibrations generated by speaker 1602 from traveling through shell 1604 to a microphone of the hearing instrument. In the example of FIG. 16, a removable port plug (not shown) may cover an opening 1606 of speaker 1602 and may keep an aperture 1608 through shell 1604 open. Opening 1606 may also allow liquid resin to escape from air void 1600.

Figure 17:
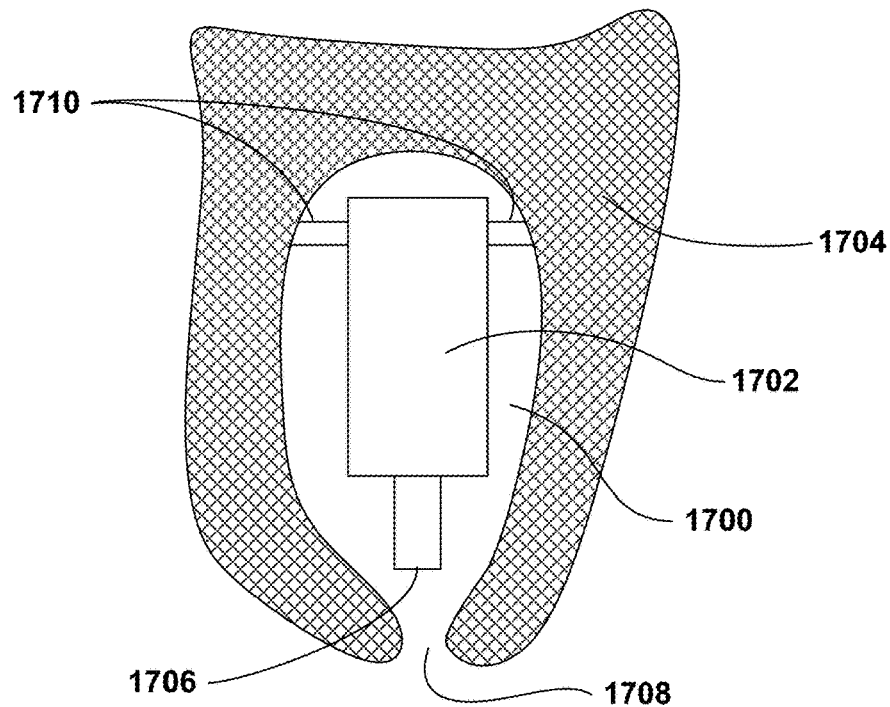
FIG. 17 is a conceptual diagram illustrating an example air void formed around a speaker with shock dampening, in accordance with one or more examples of this disclosure.

FIG. 17 is a conceptual diagram illustrating an example air void 1700 formed around a speaker 1702 with support members 1710, in accordance with one or more examples of this disclosure. In the example of FIG. 17, a 3D printing apparatus may perform volumetric 3D printing to form shell 1704 such that air void 1700 surrounds speaker 1702. In other words, shell 1704 does not directly contact speaker 1702, which may prevent vibrations generated by speaker 1702 from traveling through shell 1704 to a microphone of the hearing instrument. In the example of FIG. 17, a removable port plug (not shown) may cover an opening 1706 of speaker 1702 and may keep an aperture 1708 through shell 1704 open. Furthermore, in the example of FIG. 17, support member 1710 may connect speaker 1702 to shell 1704. Support members 1710 may initially be attached to speaker 1702 and the 3D printing apparatus may form shell 1704 around distal ends of support members 1710. Support members 1710 may provide additional structural support to speaker 1702. Moreover, support members 1710 may be formed of a shock absorbing material (e.g., an elastomer) that attenuates vibrations generated by speaker 1702. In some examples, support members 1710 may be an integral part of a component support structure.

Although shown as being horizontal in the example of FIG. 17, in other examples, support members 1710 may be vertically or diagonally oriented. In any orientation, support members 1710 may protect the microphones of the hearing instrument from vibrations and may protect electronics of speaker 1702 while locating and orienting the electronic subassembly of speaker 1702 for properly generating shell 1704 around the speaker 1702. In some examples, there may be a single support member or multiple support members. Support members 1710 may be above or below the subassembly of speaker 1702. Furthermore, in some examples, support members 1710 may allow speaker 1702 to temporarily translate or rotate under specific conditions, such as when hearing instrument is dropped. In some examples, support members 1710 may allow for a breakaway design to further speed the removal process. For examples, support members 1710 may be removed as part of the process of manufacturing the hearing instrument. Removing support members 1710 may reduce feedback. Support members 1710 may be removed in any of several ways. For example, support members 1710 may chemically dissolvable, may be broken away manually, may be broken away ultrasonically, or removed in some other way.

Thus, in the examples of FIG. 16 and FIG. 17, the operative components of a hearing instrument may include a speaker (e.g., speaker 1602, speaker 1702, etc.) and 3D printing apparatus 106 may perform volumetric 3D printing to form the shell such that an interior surface of the shell defines an interior void (e.g., void 1600, void 1700) containing the speaker and that separates any part of the speaker from direct contact with the shell. In some such examples (e.g., the example of FIG. 17), the process of manufacturing the hearing instrument includes attaching the speaker to one or more support members of the component support structure prior to placing the component support structure at least partially in the bath of the resin liquid. The support members may comprise an elastomeric material.

In some examples, it is not desirable to have a solid polymerized matrix surrounding one or more of the operative components of a hearing instrument. For instance, as described with respect to FIG. 16 and FIG. 17, it may be undesirable to have the shell be in direct contact with a speaker or other type of transducer. In such examples, drainage paths may be defined in the shell to allow the resin liquid to flow out of voids within the shell. In some examples, a flushing fluid (e.g., alcohol, air, etc.) may be introduced into the voids to help flush out resin liquid. In some examples, holes may be defined in the shell (e.g., by drilling or as part of the 3D printing process) to provide inlets for the flushing fluid.

In some instances, certain arrangements of the operative components and the component support structure may result in shadows that prevent light from reaching specific locations where polymerization of the resin liquid should occur. Accordingly, when using an orthogonal projection technique (such as that shown in the example of FIG. 4), 3D printing apparatus 106 may partially form the shell and then rotate and/or tip the partially formed hearing instrument by a given amount (e.g., 45 degrees) while still in the resin bath to illuminate volumes previously behind one or more of the operative components or component support structure. This may eliminate or minimize problems associated with such shadowing. In examples where an axial lithography technique is used (such as shown in the example of FIG. 5), 3D printing apparatus 106 may move a center of rotation perpendicular to the light source to reduce or eliminate such shadowing.

The following is a non-limited list of aspects that are in accordance with one or more techniques of this disclosure.

Aspect 1. A method for manufacturing a hearing instrument, the method comprising: placing a component support structure at least partially in a bath of a resin liquid, wherein one or more operative components of the hearing instrument are attached to or contained within the component support structure prior to the component support structure being at least partially placed in the bath of the resin liquid; and while the component support structure is at least partially in the bath, performing volumetric 3-dimensional (3D) printing to form a shell of the hearing instrument attached to the component support structure.

Aspect 2. The method of aspect 1, wherein: the component support structure comprises a faceplate that contains one or more of the operative components.

Aspect 3. The method of any of aspects 1-2, wherein: the operative components include a transducer, and the method further comprises, after performing volumetric 3D printing to form the shell: removing the hearing instrument from the bath; and after removing the hearing instrument from the bath, removing a plug covering an opening of the transducer.

Aspect 4. The method of any of aspects 1-3, wherein: the operative components include a transducer, the component support structure and the one or more operative components are supported by or suspended from a support while the component support structure is at least partially in the bath, and the support is configured to prevent entry of the resin liquid into an opening of the transducer.

Aspect 5. The method of aspect 4, wherein: the support defines a void aligned with the opening of the transducer, and the method further comprises, after removing the hearing instrument from the bath, removing a first portion of the support outside of the shell while leaving a second portion of the support connected to the shell.

Aspect 6. The method of any of aspects 1-5, wherein: the one or more operative components include a speaker, and performing volumetric 3D printing to form the shell of the hearing instrument comprises performing volumetric 3D printing to form the shell such that an interior surface of the shell defines an interior void containing the speaker and that separates any part of the speaker from direct contact with the shell.

Aspect 7. The method of aspect 6, further comprising attaching the speaker to one or more support members of the component support structure prior to placing the component support structure at least partially in the bath of the resin liquid, wherein the support members comprise an elastomeric material.

Aspect 8. The method of any of aspects 1-7, wherein the component support structure comprises a set of rigid wires that hold the operative components in position relative to one another.

Aspect 9. The method of aspect 8, wherein one or more of the wires carry at least one of power or communication between two or more of the operative components.

Aspect 10. The method of any of aspects 1-9, wherein the one or more operative components include a plurality of operative components, and an electrical trace formed on the component support structure provides at least one of power or communication between two or more of the operative components of the hearing instrument.

Aspect 11. The method of any of aspects 1-10, wherein: the one or more operative components include a plurality of operative components, the method further comprises: obtaining, by a computing system, a 3D impression of a user's ear canal; determining, by the computing system, based on the 3D impression of the user's ear canal, an arrangement of the operative components that fits within the user's ear canal; determining, by the computing system, a shape of the component support structure that holds the operative components in the determined arrangement; and forming the component support structure according to the determined shape.

Aspect 12. The method of any of aspects 1-11, wherein the one or more operative components include at least one of: a battery, a receiver, a microphone, or circuitry.

Aspect 13. A hearing instrument comprising: a component support structure; one or more operative components attached to or contained within the component support structure; and a shell attached to the component support structure, wherein the shell is formed by a process of: placing the component support structure at least partially in a bath of a resin liquid, wherein the one or more operative components of the hearing instrument are attached to or contained within the component support structure prior to the component support structure being at least partially placed in the bath of the resin liquid; and while the component support structure is at least partially in the bath, performing volumetric 3-dimensional (3D) printing to form the shell of the hearing instrument.

Aspect 14. The hearing instrument of aspect 13, wherein the component support structure comprises a faceplate that contains one or more of the operative components.

Aspect 15. The hearing instrument of any of aspects 13-14, wherein: the operative components include a transducer, and a removable plug covers an opening of the transducer while the transducer is in the bath.

Aspect 16. The hearing instrument of any of aspects 13-15, wherein: the operative components include a transducer, the component support structure and the one or more operative components are supported by or suspended from a support while the component support structure is at least partially in the bath, and the support prevents entry of the resin liquid into an opening of the transducer.

Aspect 17. The hearing instrument of aspect 16, wherein: the support defines a void aligned with the opening of the transducer, and the process to form the shell further comprises removing a first portion of the support outside of the shell while leaving a second portion of the support connected to the shell.

Aspect 18. The hearing instrument of any of aspects 13-17, wherein: the one or more operative components include a speaker, and an interior surface of the shell that defines an interior void containing the speaker and that separates any part of the speaker from direct contact with the shell.

Aspect 19. The hearing instrument of aspect 18, wherein the speaker is attached to one or more support members of the component support structure prior to placing the component support structure at least partially in the bath of the resin liquid, wherein the support members comprise an elastomeric material.

Aspect 20. The hearing instrument of any of aspects 13-19, wherein the component support structure comprises a set of rigid wires that hold the operative components in position relative to one another.

Aspect 21. The hearing instrument of aspect 20, wherein one or more of the wires carry at least one of power or communication between two or more of the operative components.

Aspect 22. The hearing instrument of any of aspects 13-21, wherein the one or more operative components include a plurality of operative components, and an electrical trace formed on the component support structure provides at least one of power or communication between two or more of the operative components of the hearing instrument.

Aspect 23. The hearing instrument of any of aspects 13-22, wherein the one or more operative components include at least one of: a battery, a receiver, a microphone, or circuitry.

Aspect 24. A system comprising: a container comprising a bath of a resin liquid; and a 3-dimensional (3D) printing apparatus configured to perform volumetric 3D printing to form a shell of the hearing instrument attached to a component support structure while the component support structure is at least partially in the bath in the container, wherein one or more operative components of the hearing instrument are attached to or contained within the component support structure prior to the component support structure being at least partially placed in the bath of the resin liquid.

Aspect 25. The system of aspect 24, wherein: the one or more operative components include a plurality of operative components, and the system further comprises a computing system configured to: obtain a 3D impression of a user's ear canal; determine, based on the 3D impression of the user's ear canal, an arrangement of the operative components that fits within the user's ear canal; and determine a shape of the component support structure that holds the operative components in the determined arrangement.

Aspect 26. The system of aspect 25, wherein the 3D printing apparatus is configured to form the component support structure according to the determined shape.

Aspect 27. The system of aspect 25, wherein: the 3D printing apparatus is a first 3D printing apparatus, and the system comprises a second 3D printing apparatus that is configured to form the component support structure according to the determined shape.

Aspect 28. The system of any of aspects 24-27, wherein the one or more operative components include at least one of: a battery, a receiver, a microphone, or circuitry.

Aspect 29. A computer-readable medium comprising instructions that, when executed, cause a 3-dimensional (3D) printing apparatus to perform volumetric 3D printing to form a shell of a hearing instrument attached to a component support structure while the component support structure is at least partially in a bath of a resin liquid, wherein one or more operative components of the hearing instrument are attached to or contained within the component support structure prior to the component support structure being at least partially placed in the bath of the resin liquid.

Aspect 30. The computer-readable medium of aspect 29, wherein the instructions cause the 3D printing apparatus to perform the methods of any of aspects 2-12.

In this disclosure, ordinal terms such as "first," "second," "third," and so on, are not necessarily indicators of positions within an order, but rather may be used to distinguish different instances of the same thing. Examples provided in this disclosure may be used together, separately, or in various combinations. Furthermore, with respect to examples that involve personal data regarding a user, it may be required that such personal data only be used with the permission of the user.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processing circuits to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, cache memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Functionality described in this disclosure may be performed by fixed function and/or programmable processing circuitry. For instance, instructions may be executed by fixed function and/or programmable processing circuitry. Such processing circuitry may include one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules. Also, the techniques could be fully implemented in one or more circuits or logic elements. Processing circuits may be coupled to other components in various ways. For example, a processing circuit may be coupled to other components via an internal device interconnect, a wired or wireless network connection, or another communication medium.

The techniques of this disclosure may be implemented in a wide variety of devices or apparatuses, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described above, in conjunction with suitable software and/or firmware.

What is claimed is:

1. A method for manufacturing a hearing instrument, the method comprising:
   placing a component support structure at least partially in a bath of a resin liquid, wherein the component support structure is user-specific, wherein one or more operative components of the hearing instrument are attached to or contained within the component support structure prior to the component support structure being at least partially placed in the bath of the resin liquid; and
   while the component support structure is at least partially in the bath, performing volumetric 3-dimensional (3D) printing to form a shell of the hearing instrument attached to the component support structure.

2. The method of claim 1, wherein:
   the component support structure comprises a faceplate that contains one or more of the operative components.

3. The method of claim 1, wherein:
   the operative components include a transducer, and
   the method further comprises, after performing volumetric 3D printing to form the shell:
      removing the hearing instrument from the bath; and
      after removing the hearing instrument from the bath, removing a plug covering an opening of the transducer.

4. The method of claim 1, wherein:
the operative components include a transducer,
the component support structure and the one or more operative components are supported by or suspended from a support while the component support structure is at least partially in the bath, and
the support is configured to prevent entry of the resin liquid into an opening of the transducer.

5. The method of claim 4, wherein:
the support defines a void aligned with the opening of the transducer, and the method further comprises, after removing the hearing instrument from the bath, removing a first portion of the support outside of the shell while leaving a second portion of the support connected to the shell.

6. The method of claim 1, wherein:
the one or more operative components include a speaker, and
performing volumetric 3D printing to form the shell of the hearing instrument comprises performing volumetric 3D printing to form the shell such that an interior surface of the shell defines an interior void containing the speaker and that separates any part of the speaker from direct contact with the shell.

7. The method of claim 6, further comprising attaching the speaker to one or more support members of the component support structure prior to placing the component support structure at least partially in the bath of the resin liquid, wherein the support members comprise an elastomeric material.

8. The method of claim 1, wherein the component support structure comprises a set of rigid wires that hold the operative components in position relative to one another.

9. The method of claim 8, wherein one or more wires of the set of rigid wires carry at least one of power or communication between two or more of the operative components.

10. The method of claim 1, wherein the one or more operative components include a plurality of operative components, and an electrical trace formed on the component support structure provides at least one of power or communication between two or more of the operative components of the hearing instrument.

11. The method of claim 1, wherein:
the one or more operative components include a plurality of operative components,
the method further comprises:
obtaining, by a computing system, a 3D impression of a user's ear canal;
determining, by the computing system, based on the 3D impression of the user's ear canal, an arrangement of the operative components that fits within the user's ear canal;
determining, by the computing system, a shape of the component support structure that holds the operative components in the determined arrangement; and
forming the component support structure according to the determined shape.

12. The method of claim 1, wherein the one or more operative components include at least one of: a battery, a receiver, a microphone, or circuitry.

13. The method of claim 1, wherein the plurality of one or more operative components includes a storage device, a communication unit, a receiver, a processor, a microphone, and a power source.

14. The method of claim 1, wherein placing the component support structure at least partially in the bath comprises at least one of:
configuring a mechanical arm to lower the component support structure into the bath,
placing the component support structure into a container and injecting the resin liquid into the container, or
suspending the component support structure over a container containing the resin liquid and lifting the container upward so that at least a part of the component support structure is immersed in the resin liquid.

15. The method of claim 1, wherein performing the volumetric 3D printing comprises performing a holographic lithography technique to form the shell or performing an axial lithography technique to form the shell.

16. The method of claim 1, wherein the shell is customized to a specific user.

17. The method of claim 2, wherein the faceplate defines one or more indentations to allow entry of the resin liquid so as to hold the faceplate to the shell.

18. The method of claim 2, wherein the faceplate is user-specific and the method further comprises performing 3D printing to form the faceplate in a shape for matching to the shell.

19. The method of claim 1, wherein the component support structure defines one or more apertures shaped and positioned to hold the one or more operative components.

20. The method of claim 7, wherein the support members allow the speaker to temporarily translate or rotate.

* * * * *